United States Patent
Suzuki

(10) Patent No.: US 9,158,088 B2
(45) Date of Patent: Oct. 13, 2015

(54) LENS BARREL AND IMAGING APPARATUS

(71) Applicant: CANON KABUSHIKI KAISHA, Tokyo (JP)

(72) Inventor: Nobuyoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 14/074,496

(22) Filed: Nov. 7, 2013

(65) Prior Publication Data

US 2014/0133039 A1   May 15, 2014

(30) Foreign Application Priority Data

Nov. 9, 2012 (JP) .................. 2012-247663
Nov. 9, 2012 (JP) .................. 2012-247664

(51) Int. Cl.
*G02B 7/02* (2006.01)
*G03B 17/04* (2006.01)
*G03B 17/17* (2006.01)

(52) U.S. Cl.
CPC .............. *G02B 7/023* (2013.01); *G03B 17/04* (2013.01); *G03B 17/17* (2013.01); *G03B 2205/0092* (2013.01)

(58) Field of Classification Search
USPC ........................................... 359/817
See application file for complete search history.

(56) References Cited

U.S. PATENT DOCUMENTS

2014/0063604 A1 *  3/2014  Wada ..................... 359/557

FOREIGN PATENT DOCUMENTS

JP   2009-169243 A   7/2009
JP   2009-181102 A   8/2009

* cited by examiner

*Primary Examiner* — James Jones
(74) *Attorney, Agent, or Firm* — Canon USA Inc. IP Division

(57) ABSTRACT

A lens barrel includes a first lens disposed on a first optical axis, a bending optical element configured to bend a light flux incident from a direction of the first optical axis toward a direction of a second optical axis extending in a direction different from the direction of the first optical axis, and a holding member configured to hold the bending optical element, wherein, when the lens barrel shifts from a photographing state to a retracted state, the holding member holding the bending optical element moves along the second optical axis while rotating around a rotational axis extending in a direction different from the directions of the first optical axis and the second optical axis.

15 Claims, 24 Drawing Sheets

LENS BARREL AND IMAGING APPARATUS

BACKGROUND OF THE INVENTION

1. Field of the Invention

The present invention relates to a lens barrel to be mounted on an imaging apparatus such as a digital still camera or a digital video camera, and more particularly to a retractable lens barrel having a bending-type photographic optical system with a plurality of lens units.

2. Description of the Related Art

As a lens barrel to be mounted on an imaging apparatus such as a digital still camera or a digital video camera, there is conventionally known a lens barrel having a bending-type photographic optical system with a plurality of lens units (hereinafter, referred to as a "bending photographic optical system"). The bending photographic optical system does not require the arrangement of a plurality of lens units in line. Thus, an overall length required in an optical axis direction of an optical system can be shortened, and, therefore, the imaging apparatus can be thinned.

As an imaging apparatus that constitutes such a bending photographic optical system, for example, there is discussed an imaging apparatus where a light flux passing through a lens unit on an object side is bent 90 degrees by a prism and is then lead to another lens unit (see Japanese imaging apparatus, when viewed from an incident direction, the prism and a second lens unit disposed nearest to the object side of the prism are rotated in different directions in the inside of a tubular member holding the first lens unit to retract the first lens unit. In an imaging apparatus discussed in Japanese Patent Application Laid-Open No. 2009-169243, a reflecting member is brought into contact with any of a first lens unit frame, a second lens unit frame, a cam tube, and an intermediate tube, and then turned to retract lens units on an object side with respect to the reflecting member.

However, the technique discussed in Japanese Patent Application Laid-Open No. 2009-181102, the prism and the second lens unit are respectively rotated in different direction in the inside of the tubular member holding the first lens unit, when viewed from the incident optical axis direction. Thus, the outer diameter of the lens barrel including the tubular member holding the first lens unit may be increased.

In addition, the technique discussed in Japanese Patent Application Laid-Open No. 2009-169243, the reflecting member is disposed almost at the middle of the intermediate tube after being rotated. Thus, there is no degree of flexibility in placement of the lens unit or the lens unit frame on the object side with respect to the reflecting member at the time of retraction, and, therefore, the outer diameter of the lens barrel including the intermediate tube may be increased.

SUMMARY OF THE INVENTION

According to an aspect of the present invention, a lens barrel includes a first lens disposed on a first optical axis, a bending optical element configured to bend a light flux incident from a direction of the first optical axis toward a direction of a second optical axis extending in a direction different from the direction of the first optical axis, and a holding member configured to hold the bending optical element, wherein, when the lens barrel shifts from a photographing state to a retracted state, the holding member holding the bending optical element moves along the second optical axis while rotating around a rotational axis extending in a direction different from the directions of the first optical axis and the second optical axis.

Further features and aspects of the present invention will become apparent from the following detailed description of exemplary embodiments with reference to the attached drawings.

DESCRIPTION OF THE EMBODIMENTS

Hereinafter, a retractable lens barrel having a bending-type photographic optical system to be used in a photographing apparatus, which is a digital still camera, according to an exemplary embodiment of present invention will be described with reference to the attached drawings.

Figure 1A:
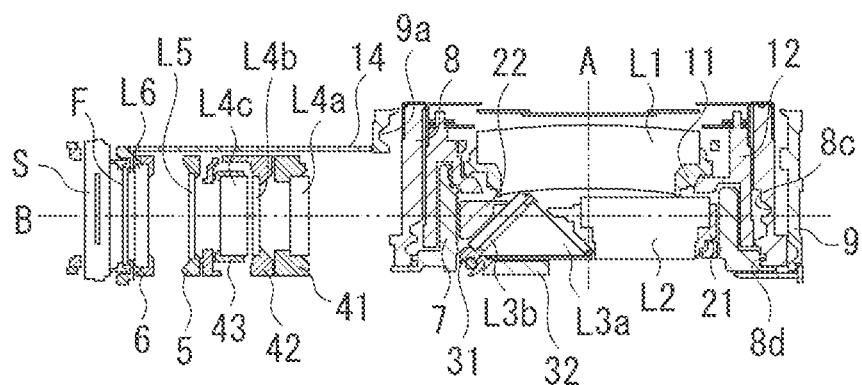
FIGS. 1A and 1B are cross-sectional views of a lens barrel according to an exemplary embodiment of the present invention in a retracted state and in a photographing state, respectively.
Figure 1B:
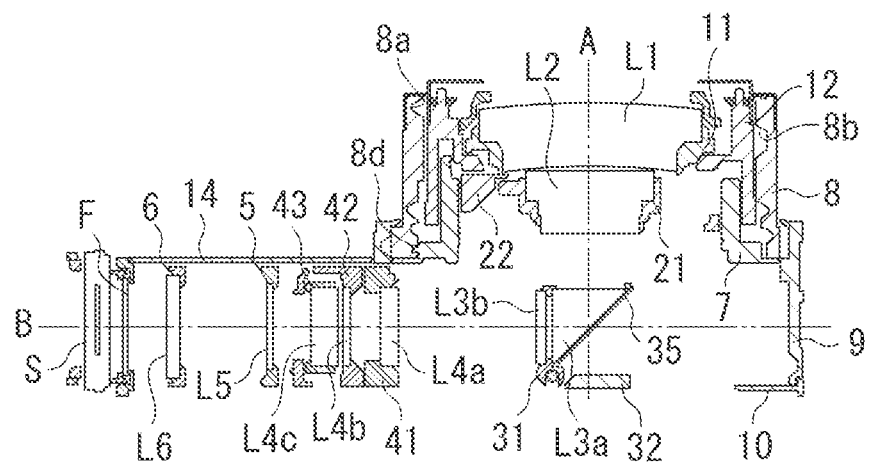
Figure 2:
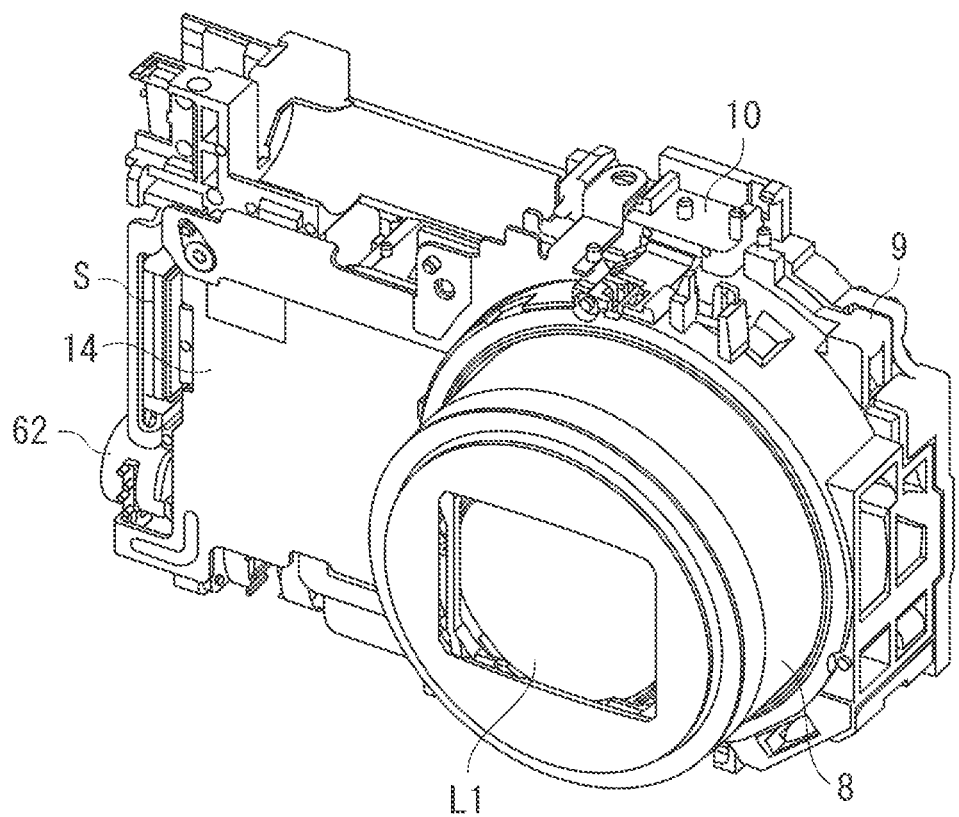
FIG. 2 is an assembling perspective view of the lens barrel according to the exemplary embodiment of the present invention.
Figure 3:
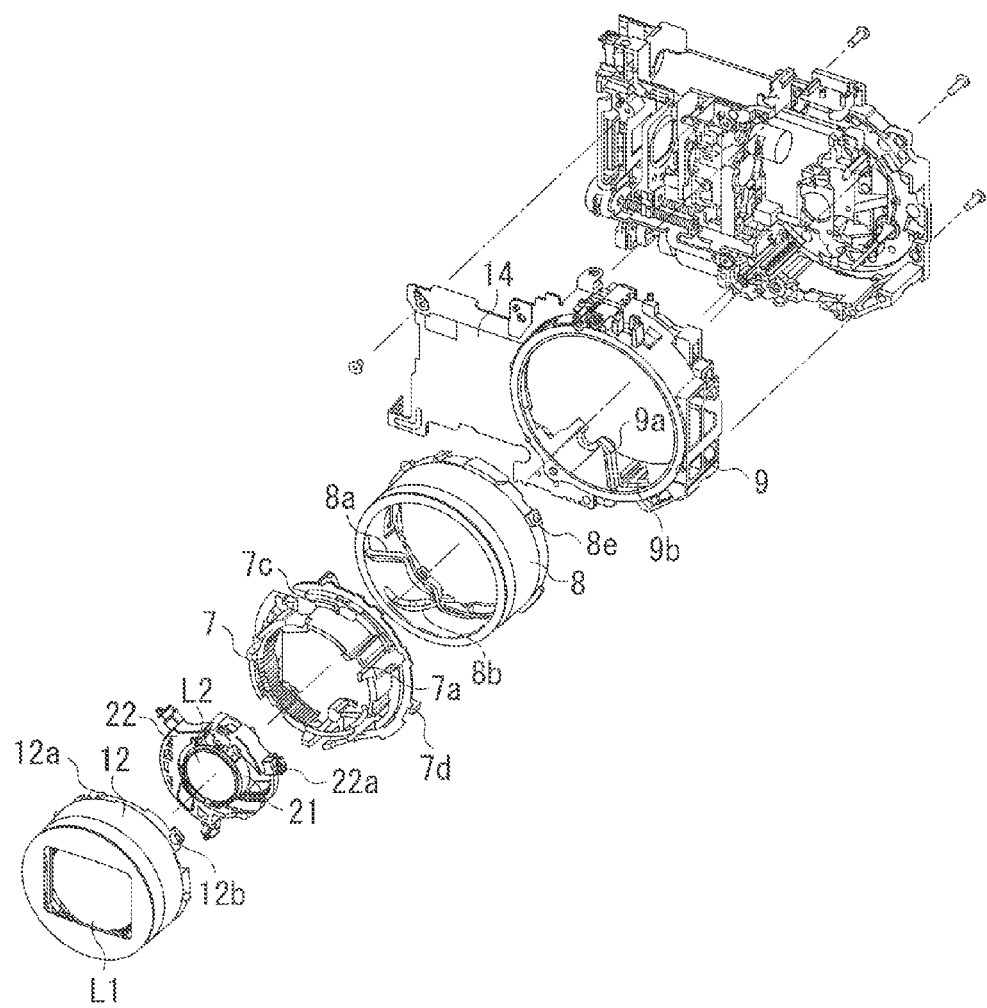
FIG. 3 is an exploded perspective view of a first optical axis unit of the lens barrel according to the exemplary embodiment of the present invention.
Figure 4:
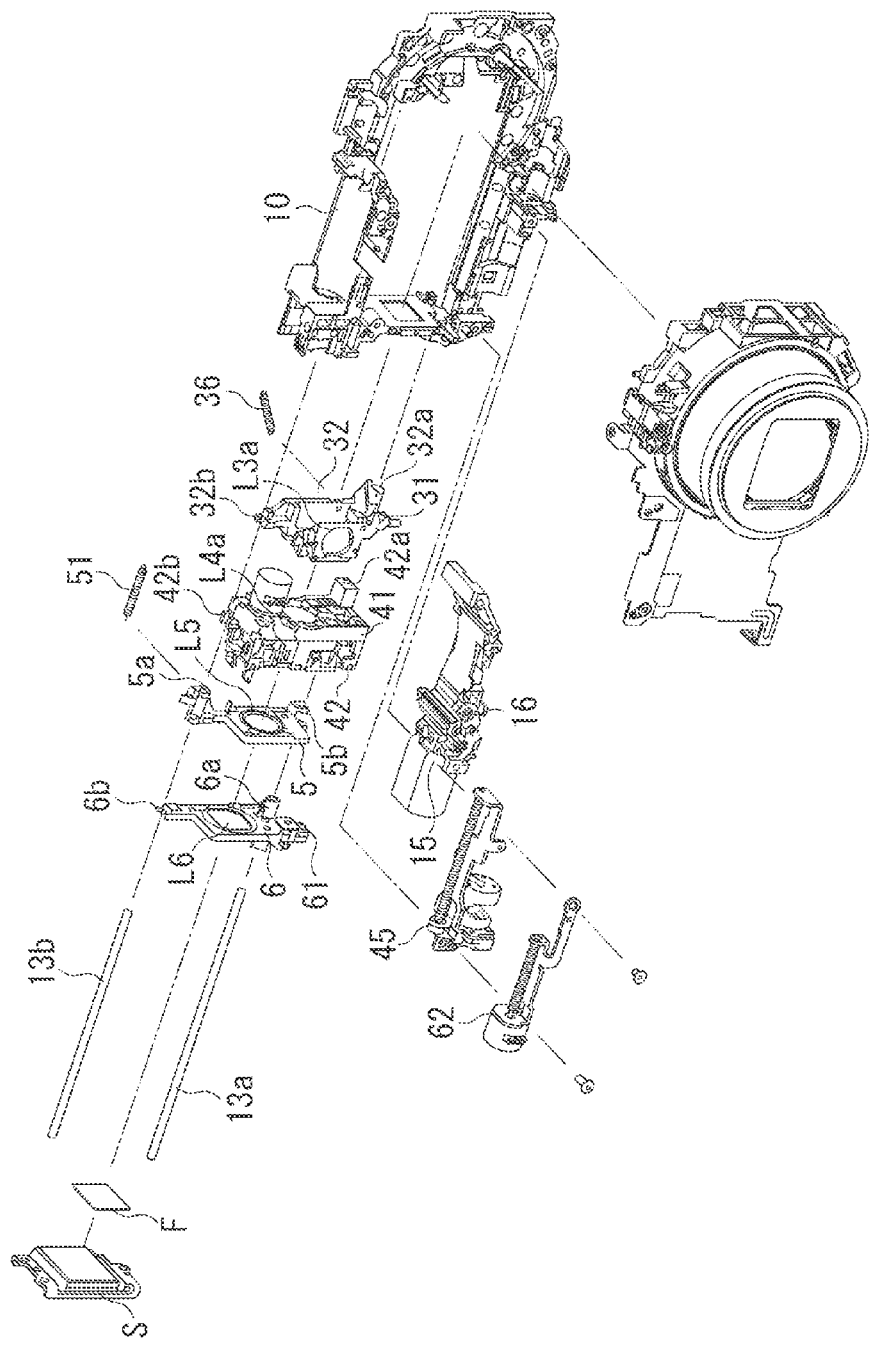
FIG. 4 is an exploded perspective view of a second optical axis unit of the lens barrel according to the exemplary embodiment of the present invention.

FIG. 1A is a cross-sectional view of the lens barrel in a retracted state (accommodated state) according to the exemplary embodiment of the present invention, and FIG. 1B is a cross-sectional view of the lens barrel in a photographing state, FIG. 2 is an assembling perspective view of the lens barrel, FIG. 3 is an exploded perspective view of a first optical axis unit of the lens barrel, and FIG. 4 is an exploded perspective view of the second optical axis unit of the lens barrel.

Figure 5:
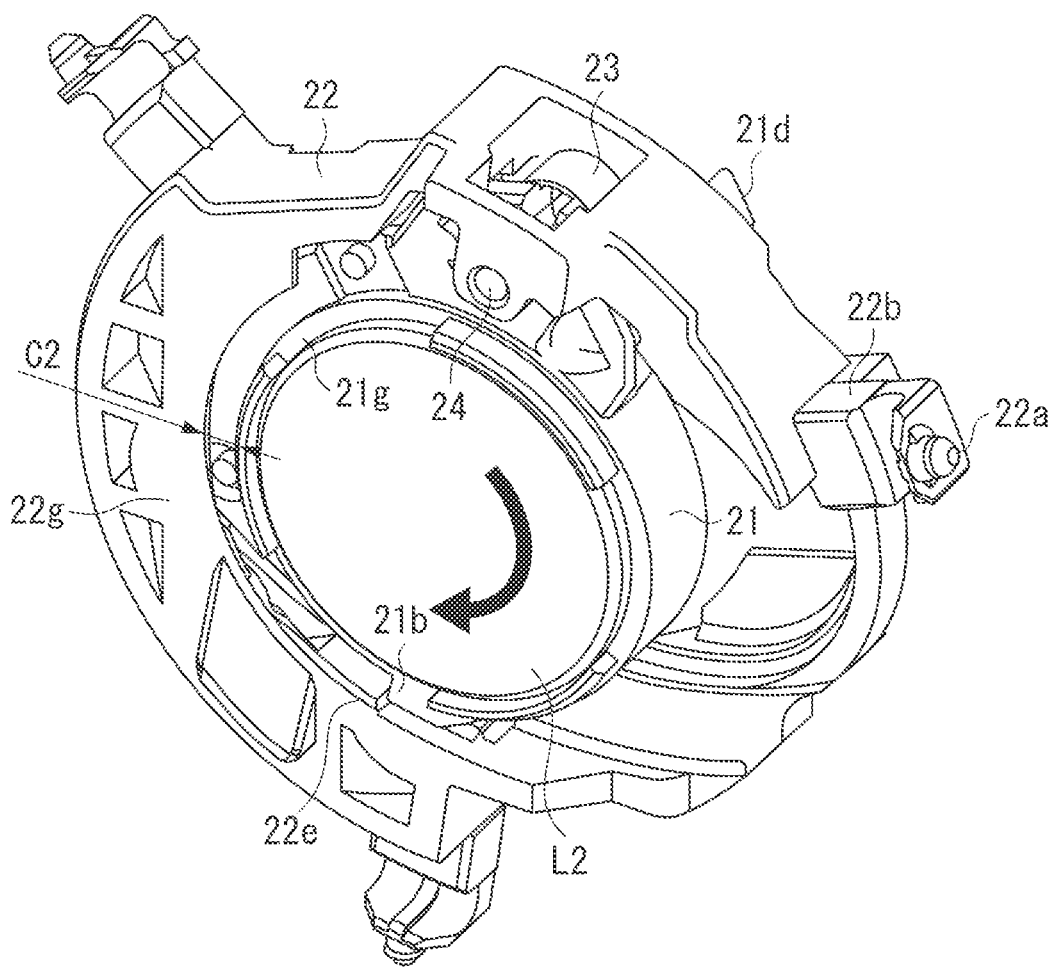
FIG. 5 is an assembling perspective view of a second lens unit of the lens barrel according to the exemplary embodiment of the present invention.
Figure 6:
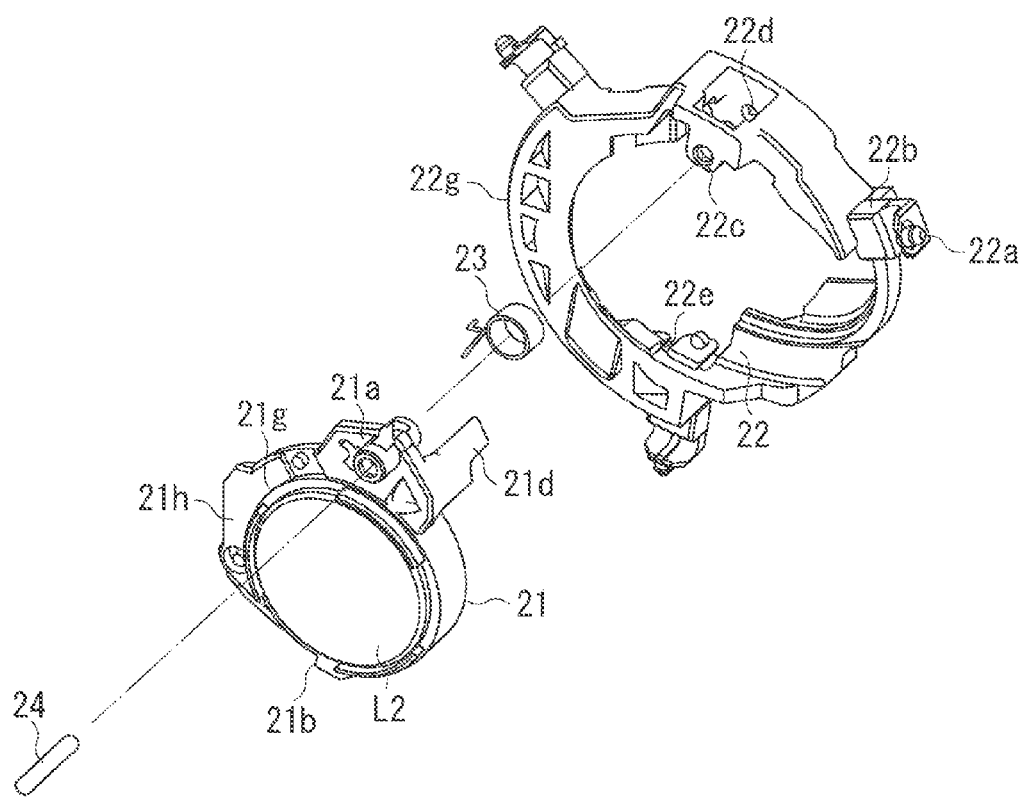
FIG. 6 is an exploded perspective view of the second lens unit of the lens barrel according to the exemplary embodiment of the present invention.
Figure 7:
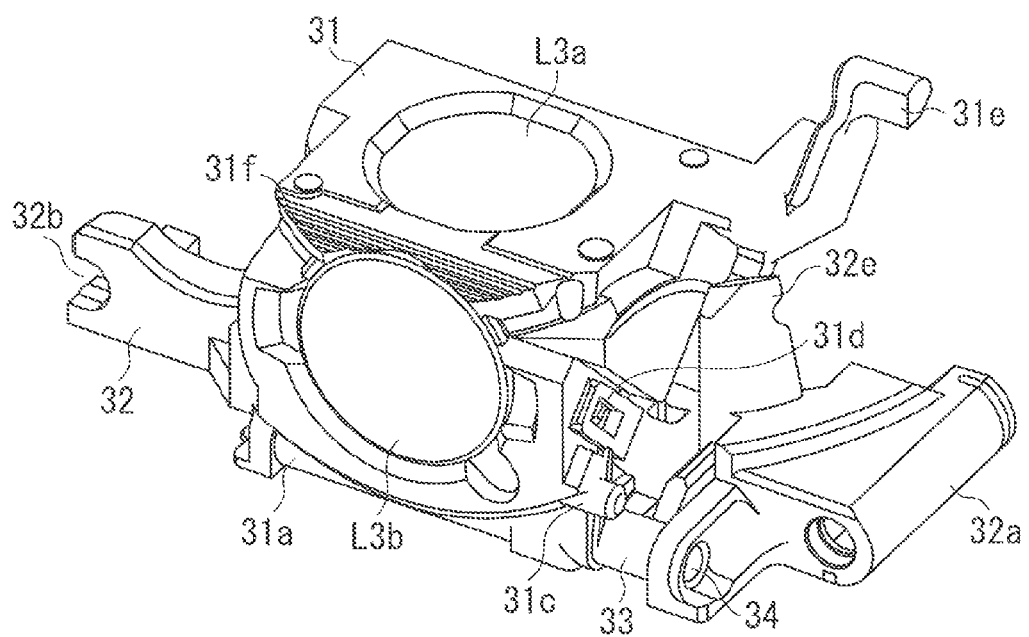
FIG. 7 is an assembling perspective view of a third lens unit of the lens barrel according to the exemplary embodiment of the present invention.
Figure 8:
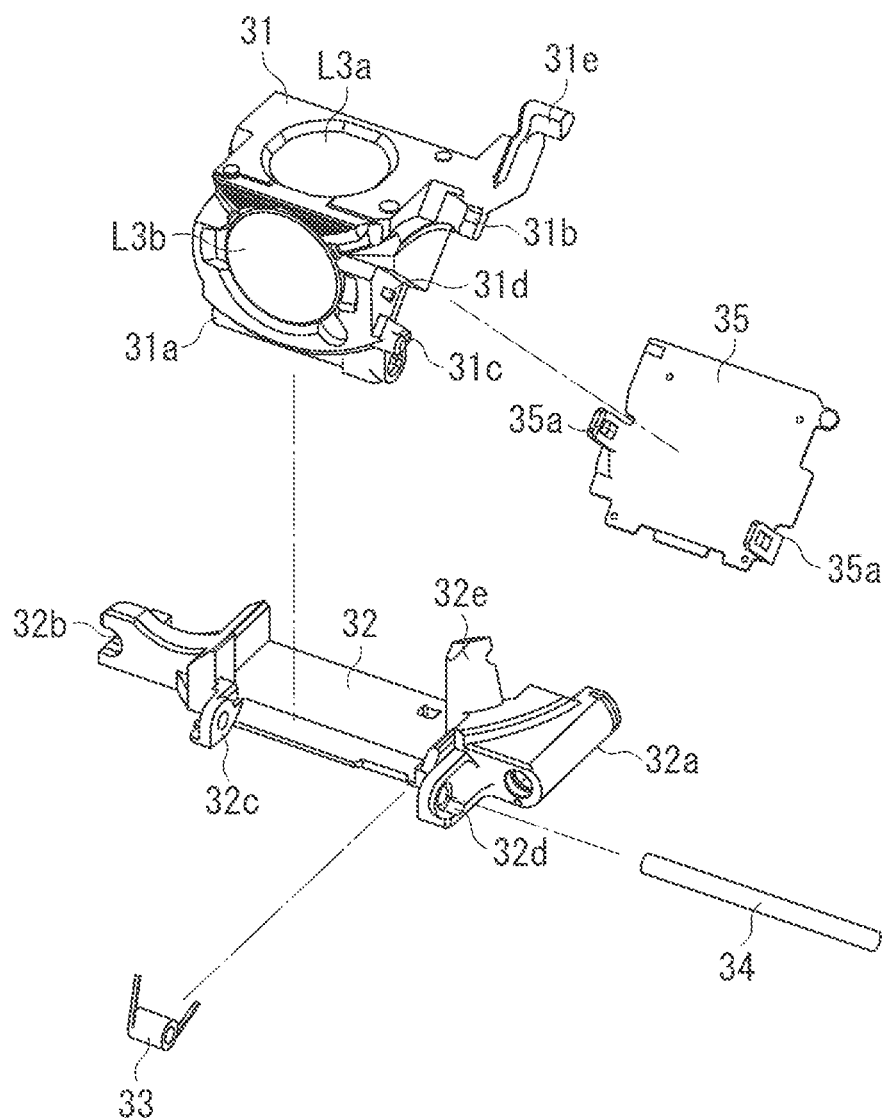
FIG. 8 is an exploded perspective view of the third lens unit of the lens barrel according to the exemplary embodiment of the present invention.
Figure 9A:
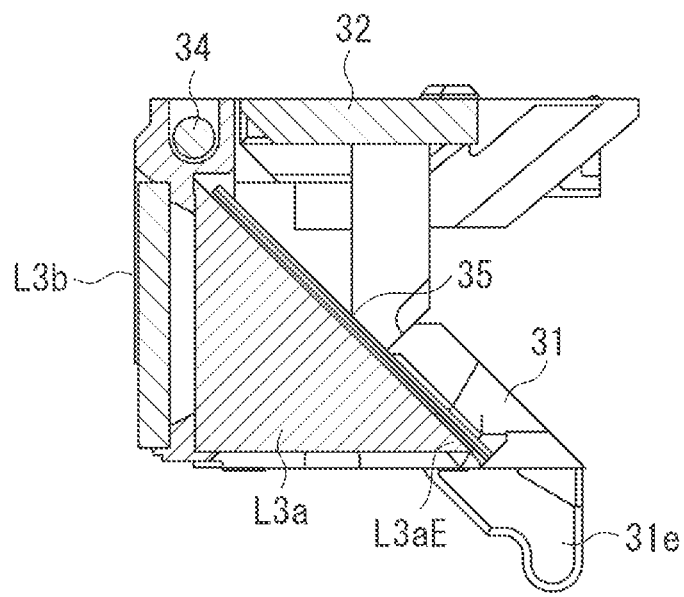
FIGS. 9A and 9B are cross-sectional views of the third lens unit of the lens barrel according to the exemplary embodiment of the present invention.
Figure 9B:
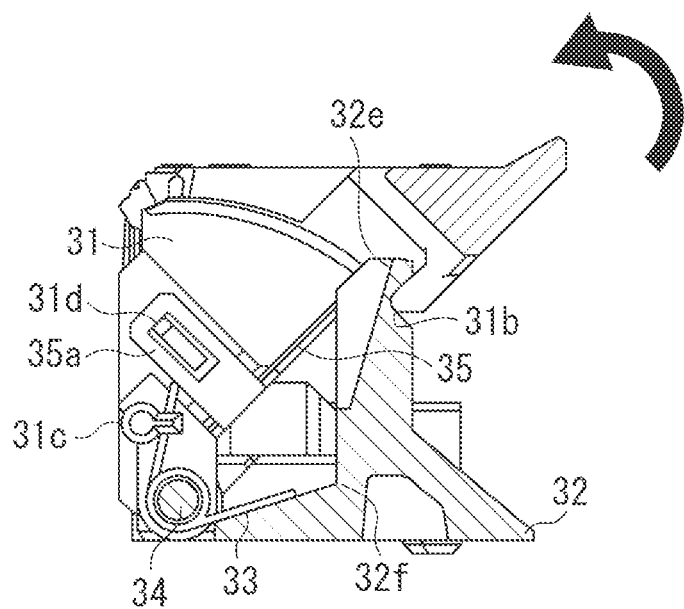
Figure 10:
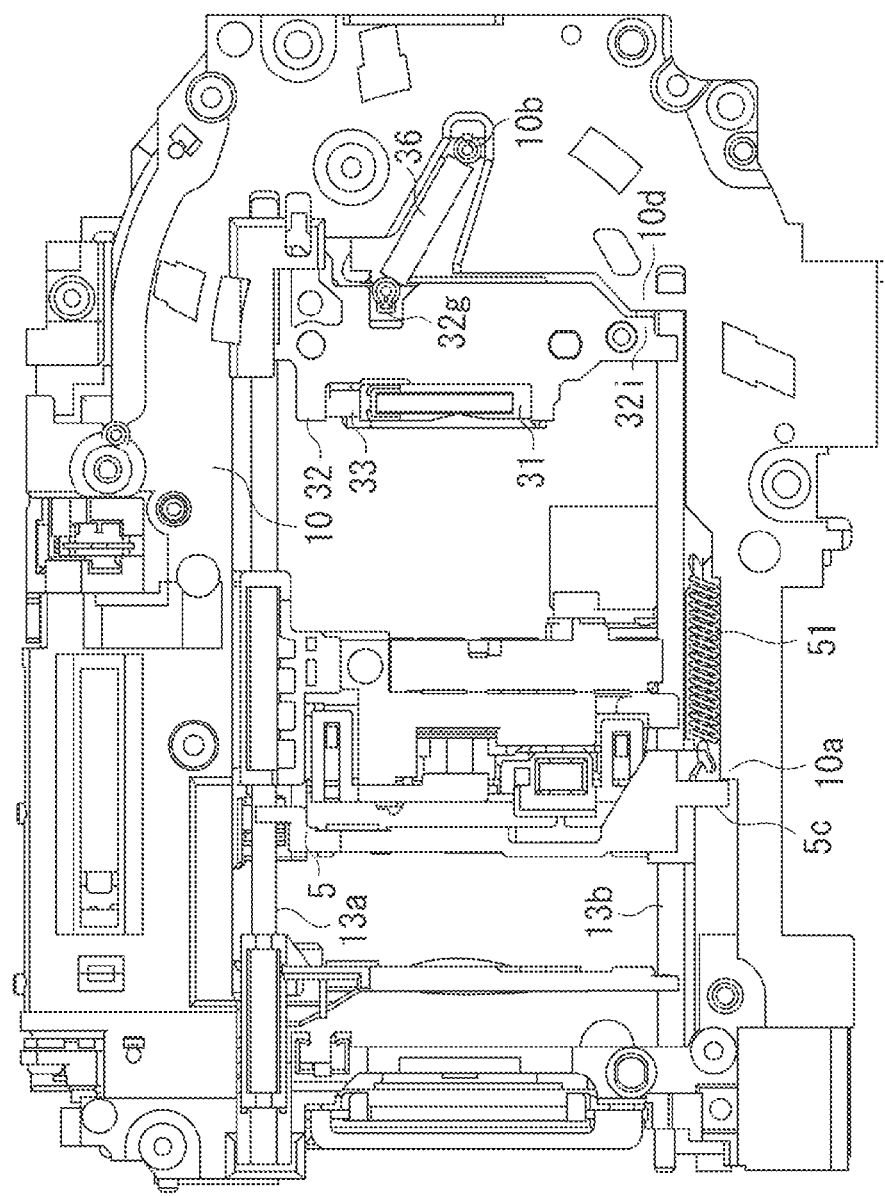
FIG. 10 is a backside view of the second optical axis unit of the lens barrel in the photographing state, according to the exemplary embodiment of the present invention.
Figure 11A:
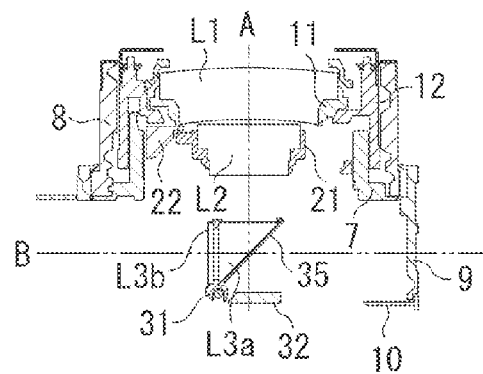
FIGS. 11A, 11B, 11C, 11D, and 11E are operation explanatory diagrams of the first optical axis unit of the lens barrel in the retracted state according to the exemplary embodiment of the present invention (photographing state (FIG. 11A) to retracted state (FIG. 11E).
Figure 11B:
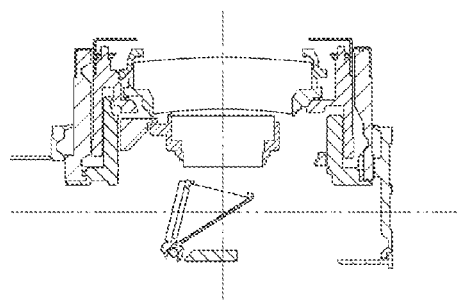
Figure 11C:
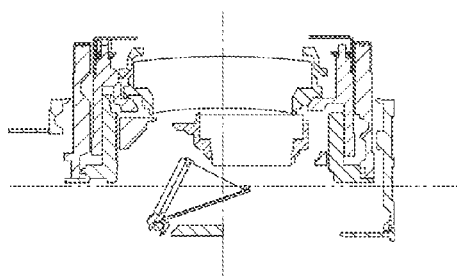
Figure 11D:
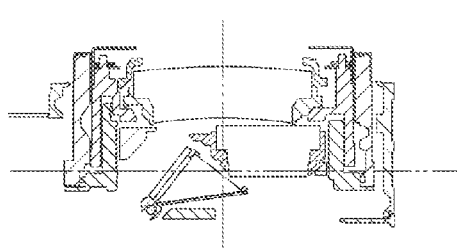
Figure 11E:
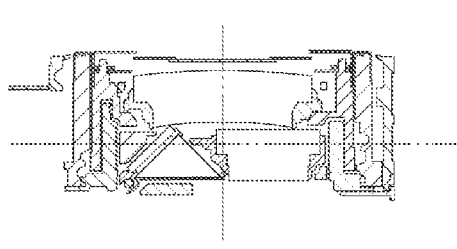

FIG. 5 is an assembling perspective view of a second lens unit of the lens barrel, and FIG. 6 is an exploded perspective view of the second lens unit. FIG. 7 is an assembling perspective view of the third lens unit of the lens barrel, FIG. 8 is an exploded perspective view of the third lens unit, FIG. 9A is a cross-sectional diagram of the third lens unit in the photographing state, FIG. 9 B is a cross-sectional diagram of the third lens unit in the photographing state, and FIG. 10 is a backside view of the second optical axis unit in the photographing state.

Figure 13:
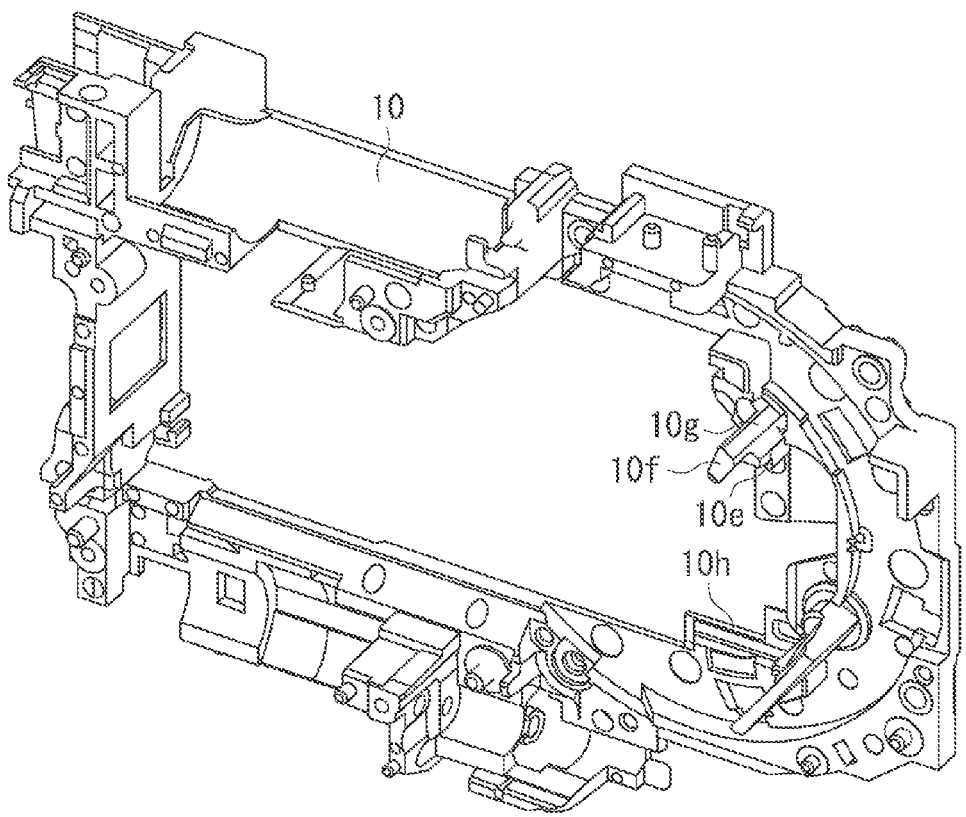
FIG. 13 is a perspective view of a fixed base plate of the lens barrel according to the exemplary embodiment of the present invention.
Figure 14A:
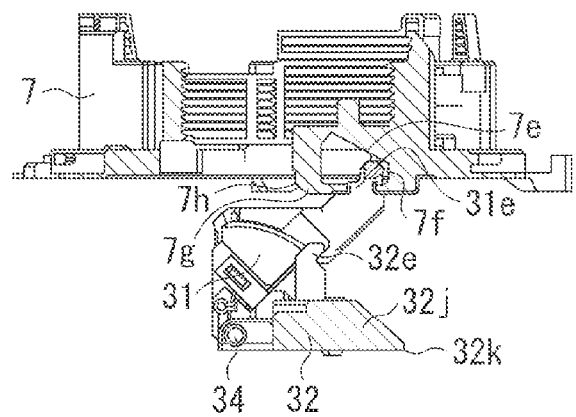
FIGS. 14A, 14B, 14C, and 14D are operation explanatory diagrams of the third lens unit of the lens barrel in the retracted state according to the exemplary embodiment of the present invention (photographing state (FIG. 14A) to retracted state (FIG. 14D)).
Figure 14B:
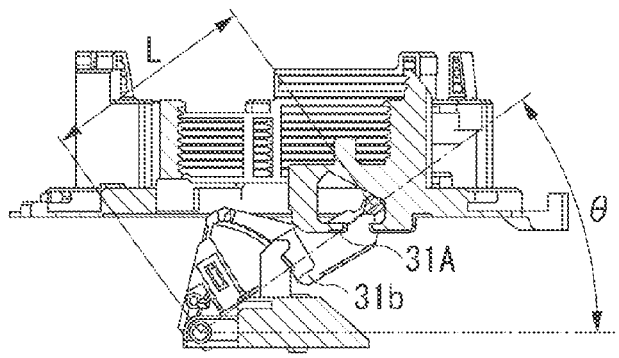
Figure 14C:
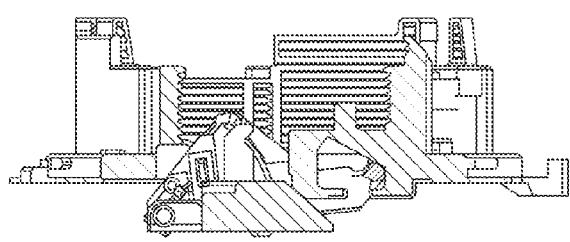
Figure 14D:
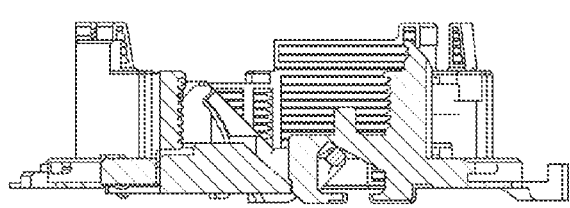
Figure 15:
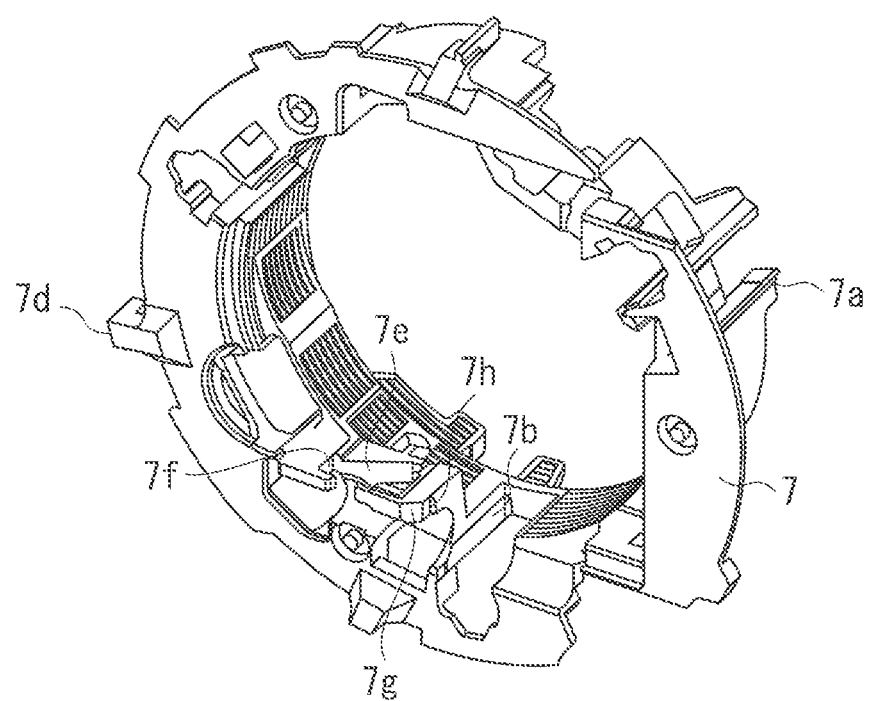
FIG. 15 is a perspective view of a rectilinear motion tube of the lens barrel according to the exemplary embodiment of the present invention.

Furthermore, FIG. 11 is an explanatory diagram illustrating the operation of the first optical axis unit in the retracted state, FIG. 13 is a perspective view of the fixed base plate of the lens barrel, FIG. 14 is an explanatory diagram illustrating the operation of the third lens unit in the retracted state, and FIG. 15 is a perspective view of the rectilinear motion tube of the lens barrel.

Figure 16A:
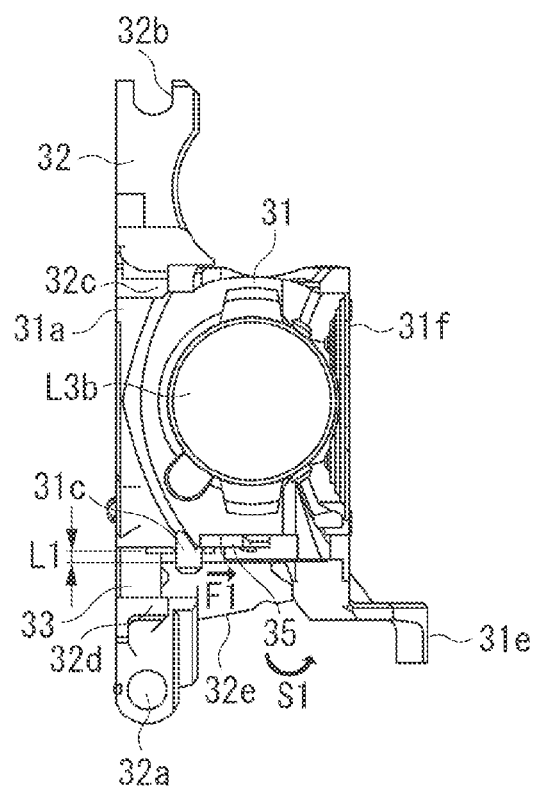
FIGS. 16A and 16B are side views of the third lens unit of the lens barrel according to a reference embodiment of the present invention.
Figure 16B:
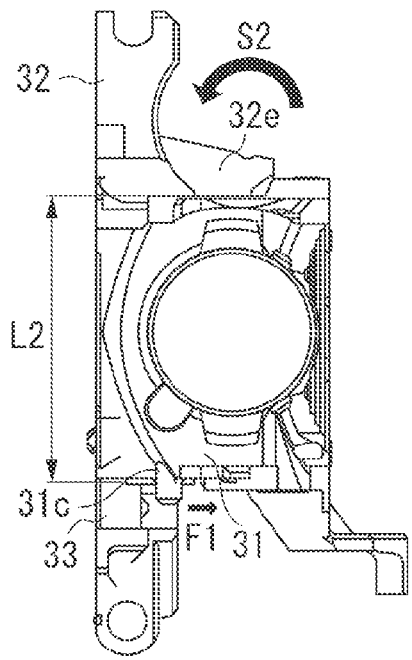
Figure 17A:
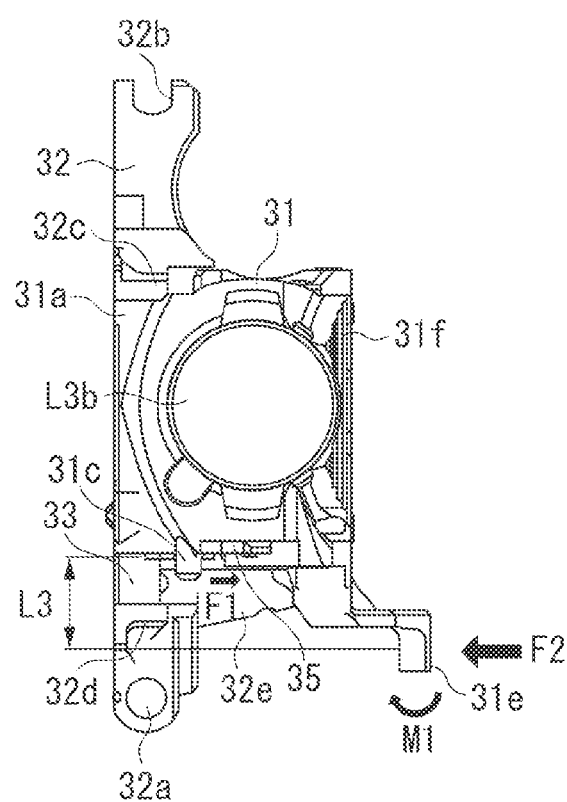
FIGS. 17A and 17B are side views of the third lens unit of the lens barrel according to the reference embodiment of the present invention.
Figure 17B:
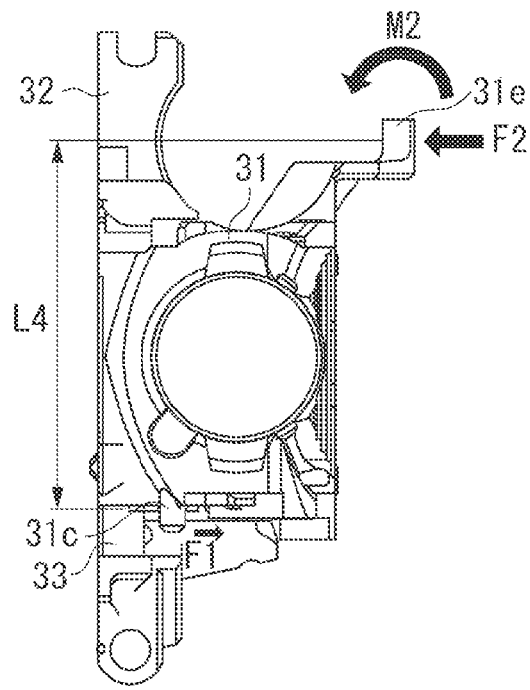
Figure 18:
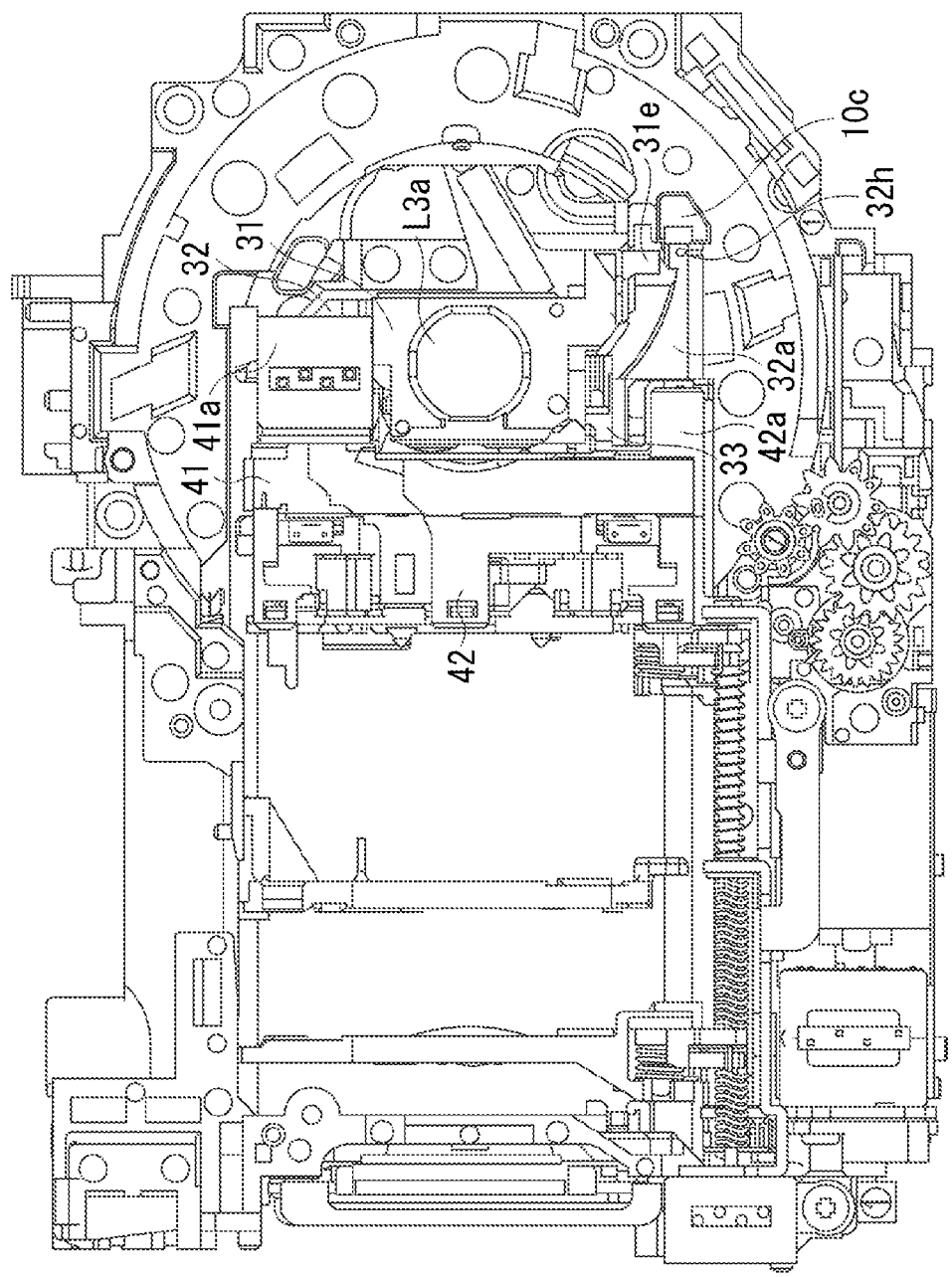
FIG. 18 is a front view of the second optical axis unit according to the exemplary embodiment of the present invention.

Furthermore, FIG. 16 A is a side view of the third lens unit, FIG. 16 B is a side view of the third lens unit of the lens barrel according to a reference embodiment of the present invention, FIG. 17A is a side view of the third lens unit, and FIG. 17B is a side view of the third lens unit of the lens barrel according to the reference embodiment of the present invention. Furthermore, FIG. 18 is a front view of the second optical axis unit.

Figure 19A:
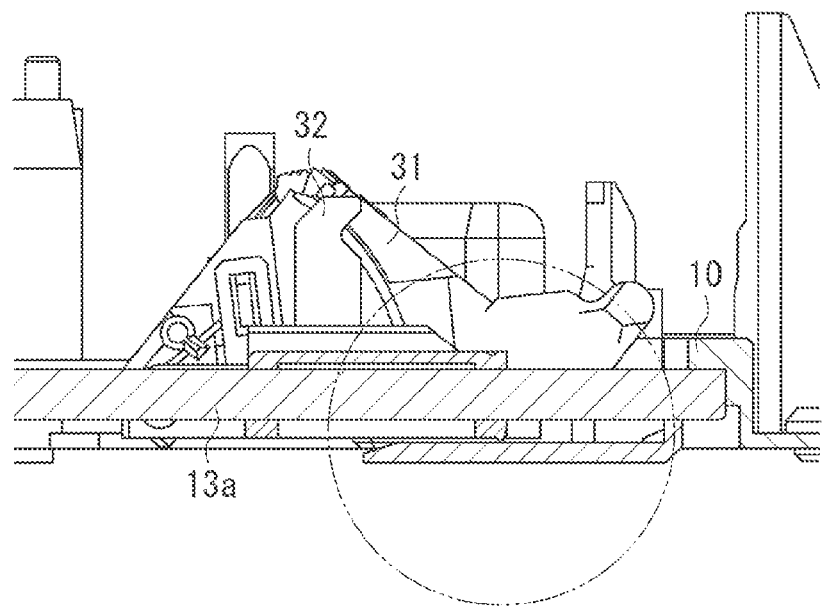
FIGS. 19A and 19B are cross-sectional views of a positioning portion of a third unit base plate of the third lens unit according to the exemplary embodiment of the present invention.
Figure 19B:
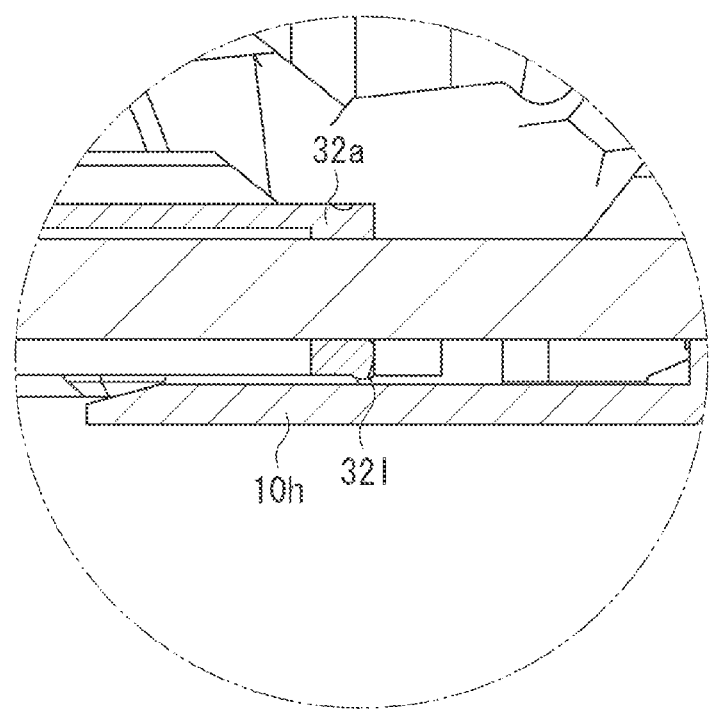
Figure 20A:
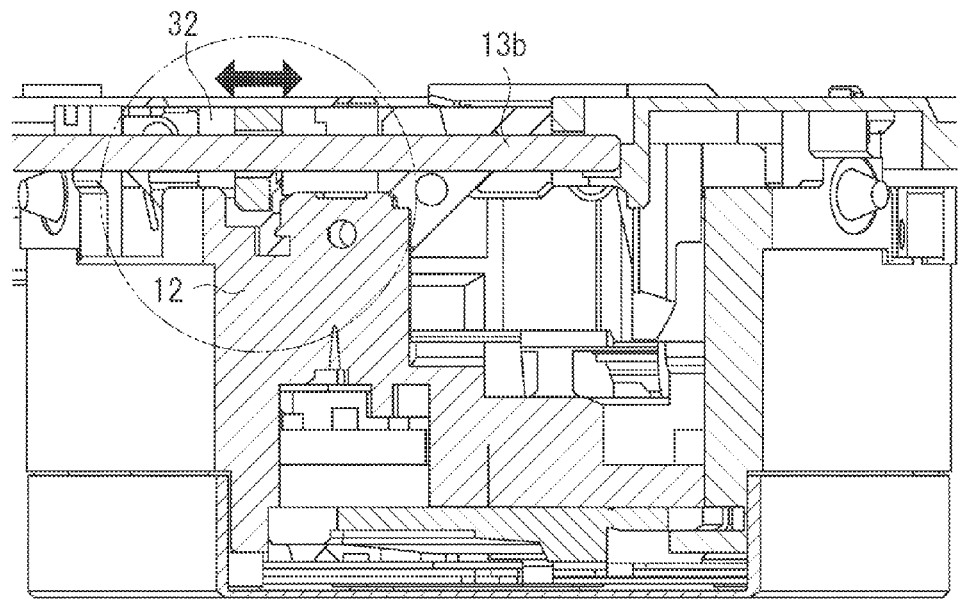
FIGS. 20A to 20B are cross-sectional views of a vibration stopper of the third unit base plate of the third lens unit according to the exemplary embodiment of the present invention.
Figure 20B:
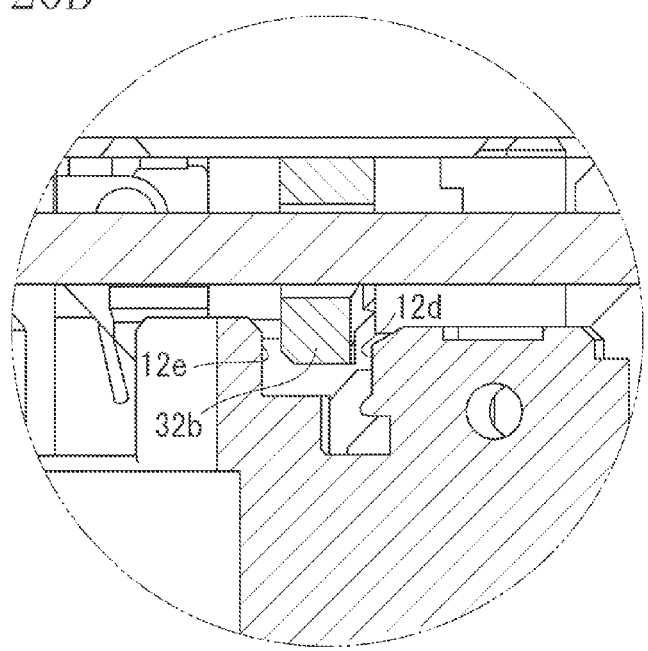
Figure 21:
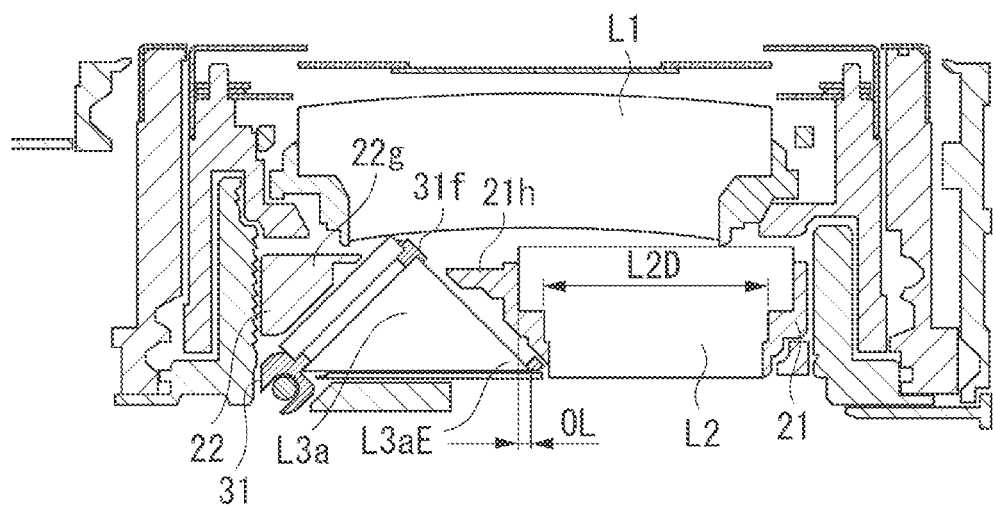
FIG. 21 is a cross-sectional view of the first optical axis unit of the lens barrel in the retracted state according to the exemplary embodiment of the present invention.
Figure 22A:
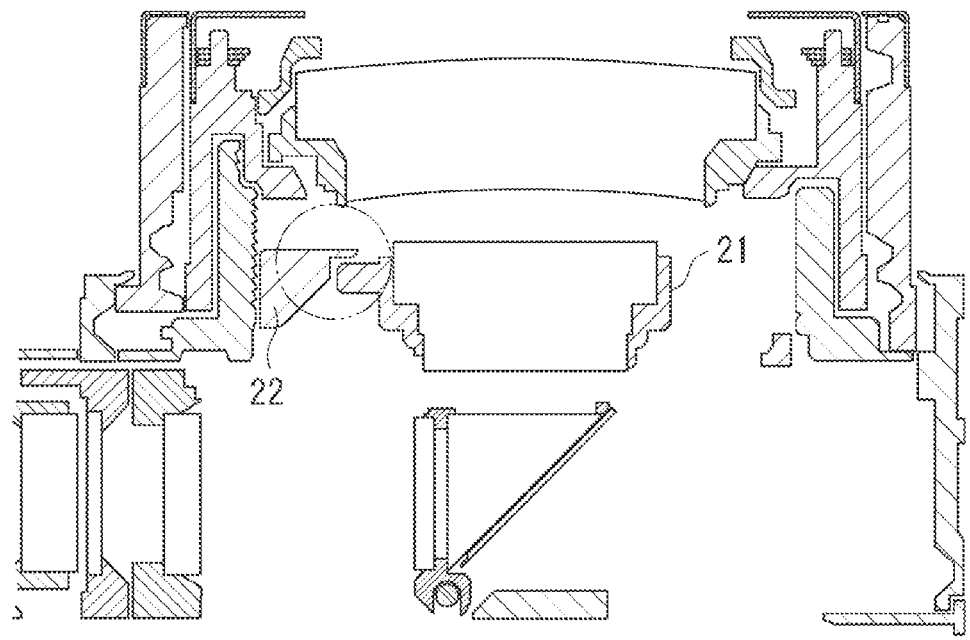
FIGS. 22A and 22B are cross-sectional views of the first optical axis unit of the lens barrel in the photographing state according to the exemplary embodiment of the present invention.
Figure 22B:
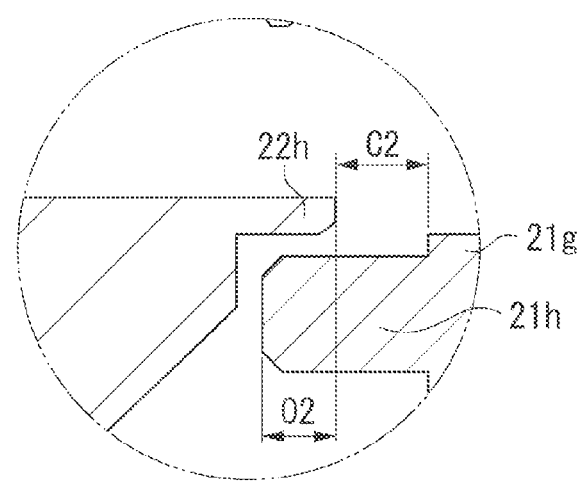

Furthermore, FIG. 19A is a cross-sectional view of the positioning portion of the third unit base plate as a support member of the third lens unit, FIG. 19B is a partial enlarged view of FIG. 19A. FIG. 20A is a cross-sectional view of a vibration stopper of the third unit base plate of the third lens unit, and FIG. 20B is a partial enlarged view of FIG. 20A. Furthermore, FIG. 21 is a cross-sectional view of the first optical axis unit in the retracted state, and FIG. 22 is a cross-sectional view of a first optical axis unit in the photographing state.

Figure 23A:
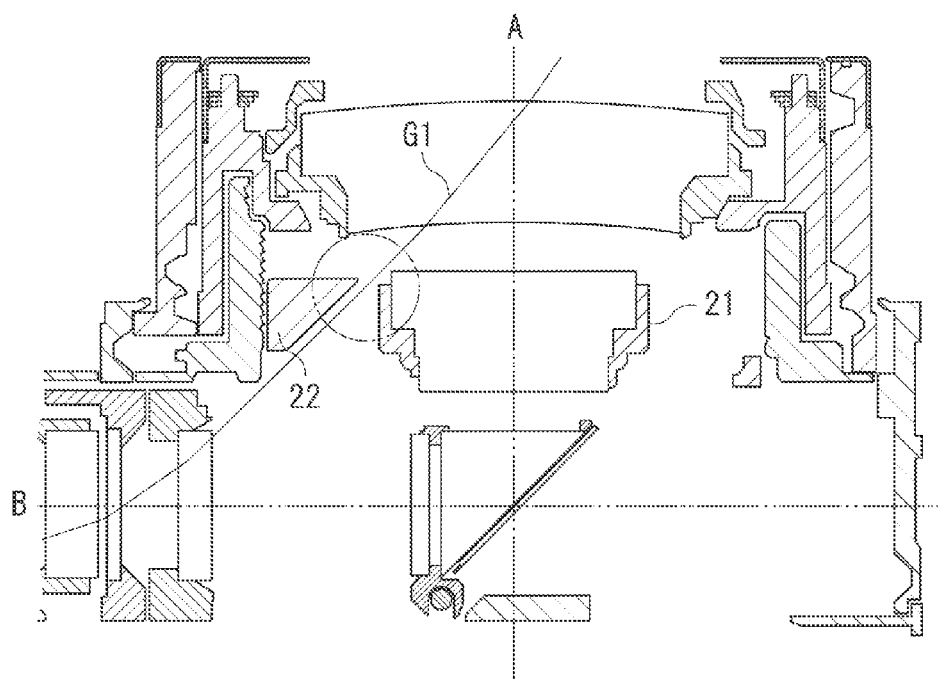
FIGS. 23A and 23B are explanatory diagrams illustrating light flux entry in the lens barrel according to the reference embodiment of the present invention.
Figure 23B:
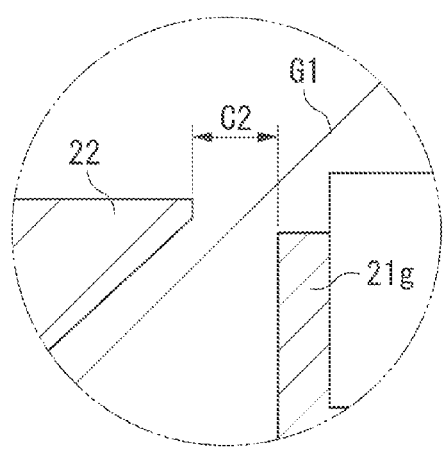
Figure 24A:
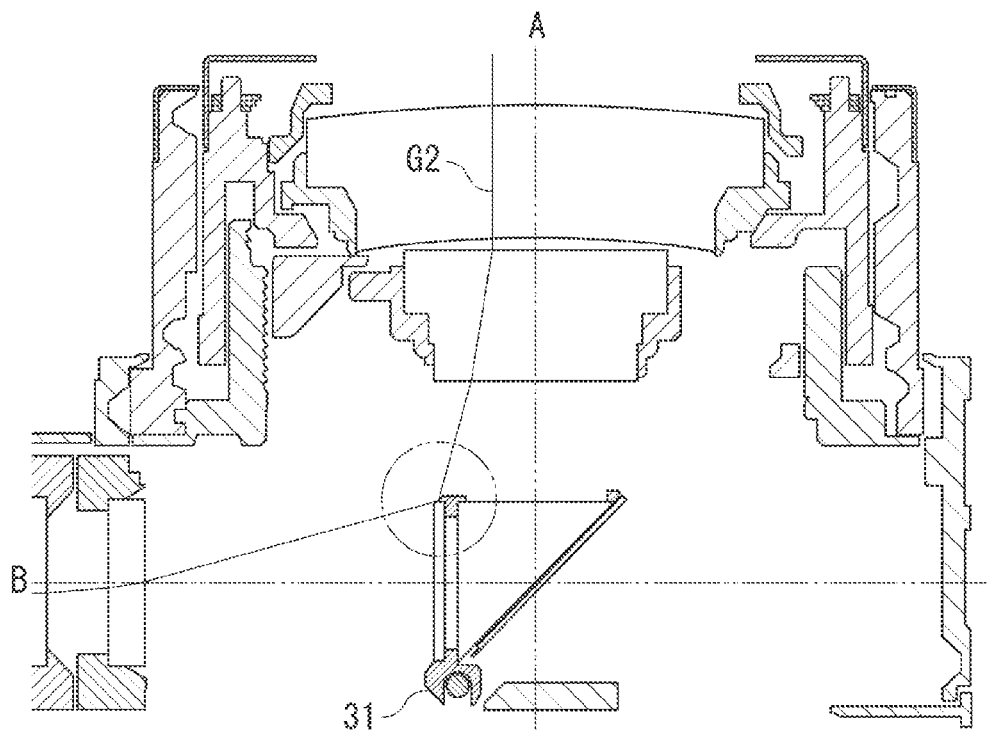
FIGS. 24A and 24B are explanatory diagrams illustrating light flux entry in the lens barrel according to the reference embodiment of the present invention.

Furthermore, FIG. 23A is an explanatory diagram illustrating light flux entry in the lens barrel according to the reference embodiment of the present invention, and FIG. 23B is a partial enlarged view of FIG. 23A. Furthermore, FIG. 24A is an explanatory diagram illustrating light flux entry in the lens barrel according to the reference embodiment of the present invention, and FIG. 20B is a partial enlarged view of FIG. 24A.

First, referring now to FIG. 1A to FIG. 4, the configuration of the lens barrel according to the exemplary embodiment of the present invention will be described.

The lens barrel according to the exemplary embodiment of the present invention is a photographic optical system having a six-unit configuration: a first lens unit L1; a second lens unit L2; a third lens unit L3b; fourth lens units L4a, L4b, and L4c; a fifth lens unit L5; and a sixth lens unit L6, in order from an object side. In addition, a prism L3a is provided to lead a first optical axis A to a second optical axis B perpendicular to (disposed at 90 degrees to) the first optical axis A.

A first unit holding frame 11 holds the first lens unit L1, while being held in a first unit tube 12. A set of three cam pins 12a disposed on a lower part of an outer peripheral surface of the first unit tube 12 engages with a cam groove 8a formed in an inner peripheral surface of the cam tube 8. Furthermore, another set of three cam pins 12b is inserted and fit into a cam groove 8b formed in the inner peripheral surface of the cam tube 8 with a slight clearance therebetween. Furthermore, advance keys (not shown) are formed at three portions of the inner peripheral surface of the first unit tube 12 and engage with a straight groove 7a formed in an outer peripheral surface of a rectilinear motion tube 7.

A second unit holding frame 21 is provided to hold the second lens unit L2. The second unit holding frame 21 is held in a second unit base plate 22. Three cam pins 22a disposed on an outer peripheral surface of the second unit base plate 22 engage with a cam groove 8c formed in an inner peripheral surface of the cam tube 8. In addition, advance keys 22b are formed at the same portions as those of the cam pins 22a (see FIG. 5) and engage with a straight groove 7b formed in the rectilinear motion tube 7 (see FIG. 15).

A groove portion 8d formed at a lower part of the inner peripheral surface of the cam tube 8 engages with a plurality of projected portions 7c formed at a lower part of the outer peripheral surface of the rectilinear motion tube 7. The cam tube 8 is rotatably supported by the rectilinear motion tube 7, and moves in a direction of the first optical axis A together with the rectilinear motion tube 7. Furthermore, three cam pins 8e disposed on a lower part of the outer peripheral surface of the cam tube 8 engage with a cam groove 9a formed in an inter peripheral surface of a fixed tube 9.

The rectilinear motion tube 7 restricts advancement of the first unit tube 12 and the second unit base plate 22. Furthermore, four advance keys formed at the lower end of the outer peripheral surface of the rectilinear motion tube 7 engage with a straight groove 9b formed in the inner peripheral surface of the fixed tube 9.

A gear portion (not shown) formed at a lower part of the outer peripheral surface of the cam tube 8 is coupled to a cam tube driving device including a DC motor 15 and a plurality of gear components 16.

When the output of the cam tube driving device causes rotation of the cam tube 8, the cam tube 8 moves in the direction of the first optical axis A while rotating as a result of interaction between the cam pins 8e of the cam tube 8 and the cam groove 9a of the fixed tube 9.

The first unit tube 12 moves in the direction of the first optical axis A without rotation as a result of interaction between the cam pins 12a of the first unit tube 12 and the cam groove 8a of the cam tube 8 and interaction between the advance keys (not shown) of the first unit tube 12 and the straight groove 7a of the rectilinear motion tube 7.

The second unit base plate 22 moves in the direction of the optical axis A without rotation as a result of interaction between the cam pins 22a of the second unit base plate 22 and the cam groove 8c of the cam tube 8 and interaction between the advance keys 22b of the second unit base plate 22 and the straight groove 7b of the rectilinear motion tube 7.

A third unit holding frame 31 is provided to hold the third lens unit L3b, while being held in a third unit base plate 32. A positioning portion 32a and a vibration stopper 32b, which are formed on the third unit base plate 32, engage with guide bars 13a and 13b disposed on a fixed base plate 10, and are thereby movably supported in a direction of a second optical axis B.

The prism L3a deflects a light flux entering from the direction of the second optical axis B perpendicular to the direction of the first optical axis A.

A fourth unit base plate 42 is provided to hold the fourth lens unit L4b. A positioning portion 42a and a vibration stopper 42b, which are formed on the fourth unit base plate 42, engage with the guide bars 13a and 13b disposed on the fixed base plate 10, and are thereby movably supported in the direction of the second optical direction B. Furthermore, a rack (not shown) is disposed on the fourth unit base plate 42, and is screwed in a screw of a stepping motor 45.

When an output of the stepping motor 45 drives the rack (not shown), the fourth unit base plate 42 moves in the second optical axis B direction without rotation as a result of interaction between the positioning portion 42a and the vibration stopper 42b with the guide bars 13a and 13b.

A diaphragm shutter 41 is provided and fixed on the fourth unit base plate 42 with screws (not shown).

A fourth unit holding frame 43 is provided to hold the fourth lens unit L4c, and is held in the fourth unit base plate 42.

A fifth unit holding frame 5 is provided to hold the fifth lens unit L5. A positioning portion 5a and a vibration stopper 5b, which are formed on the fifth unit holding frame 5, engage with the guide bars 13a and 13b disposed on the fixed base plate 10, and are thereby movably supported in the direction of the second optical axis B.

A fifth unit spring 51 urges the fifth unit holding frame 5 toward an object in the second optical axis B direction. In the photographing state, a contact portion 5c of the fifth unit holding frame 5 is brought into contact with a contact portion 10a of the fixed base plate (see FIG. 10).

A sixth unit holding frame 6 is provided to hold the sixth lens unit L6. A positioning portion 6a and a vibration stopper 6b, which are formed on the sixth unit holding frame 6, engage with the guide bars 13a and 13b disposed on the fixed base plate 10, and are thereby movably supported in the direction of the second optical axis B.

Furthermore, a rack 61 is disposed on the sixth unit holding frame 6, and is screwed in a screw of a stepping motor 62. When the output of the stepping motor 62 drives the rack 61, the sixth unit holding frame 6 moves in the direction of the second optical axis B without rotation as a result of interaction of the positioning portion 6a and the vibration stopper 6b with the guide bars 13a and 13b.

An image sensor S and an optical filter F are held on the fixed base plate 10. Furthermore, the fixed tube 9 and a cover 14 are fixed on the fixed base plate 10 with screws.

The lens barrel according to the present exemplary embodiment performs a zooming operation by moving the first unit tube 12 and the second unit base plate 22 back and forth in the direction of the first optical axis A and moving the diaphragm shutter 41 and the fourth unit base plate 42 back and forth in the direction of the second optical axis B. Furthermore, the sixth unit holding frame 6 moves back and forth in the second optical axis B direction to perform a focusing operation. Here, during the both operations, a third unit holding frame 31 and the fifth unit holding frame 5 are resting at their predetermined positions.

Next, the configuration of the second lens unit will be described with reference to FIG. 5 and FIG. 6.

The second unit holding frame 21 rotates together with a guide bar 24 as the guide bar 24 is press fit in the positioning portion 21a formed in the second unit holding frame 21 serving as a first holding member. Furthermore, the guide bar 24 fits in the positioning portions 22c and 22d of the second unit base plate 22 serving as a second holding member. Thus, the guide bar 24 is rotatably supported by the second unit base plate 22.

In addition, the second unit holding frame 21 has a hook engaging portion (not shown), on which one end of a spring 23 exerting a torsional force is hooked. The spring 23 is disposed on the outer periphery of the positioning portion 21a of the second unit holding frame 21, and the other end of the spring 23 is hooked on an engaging portion 22f of the second unit base plate 22. Furthermore, the second unit holding frame 21 is urged clockwise around the guide bar 24, as viewed from the object in the direction of the first optical axis A, and, against the second unit base plate 22, a rotation preventing portion 21b formed on the second unit holding frame 21 is in a state of contacting with a rotation preventing portion 22e formed in the second unit base plate 22.

At this time, the center of the second lens unit L2 is located at the same position (photographing position) coinciding with the first optical axis A. Furthermore, the second unit holding frame 21 serving as a first holding member also receives a compressive force of the spring 23. The positioning portion 21a of the second unit holding frame 21 is in a state of contacting with the positioning portion 22c of the second unit base plate 22. In other words, the second unit holding frame 21 is also positioned in the extending direction of the guide bar 24 (in the direction of the first optical axis A).

The second unit base plate 22 serving as a second holding member employs the rectilinear motion tube 7 as a guide member to move in the direction of the first optical axis A, while holding the first holding member 21 holding the second lens unit 2L.

Next, the configuration of the third lens unit will be described with reference to FIG. 7 to FIG. 10.

The third unit holding frame 31 rotates together with a guide bar 34 as the guide bar 34 is press fit in a positioning portion 31a formed in the third unit holding frame 31. Furthermore, the guide bar 34 fits in positioning portions 32c and 32d of the third unit base plate 32, and the guide bar 34 is thus rotatably supported by the third unit base plate 32. Since the guide bar 34 is space-efficient, the guide bar 34 can be disposed in the vicinity of an apex angle of the prism L3a on the imaging plane side in the direction of the first optical axis A.

In addition, the third unit holding frame 31 has a hook engaging portion 31c, on which one end of a spring 33 exerting a torsion force thereon is hooked. The spring 33 is disposed on the outer periphery of the guide bar 34, and the other end of the spring 33 is hooked on an engaging portion 32f of the third unit base plate 32. Furthermore, the third unit holding frame 31 is urged counterclockwise around the guide bar 34 as represented by the arrow in FIG. 9B, and, against the third unit base plate 32, a rotation preventing portion 31b formed on the third unit holding frame 31 is in a state of contacting with a rotation preventing portion 32e formed in the third unit base plate 32.

At this time, the reflection surface of the prism L3a is located at a position (photographing position) at an angle of approximately 45 degrees with both the first optical axis A and the second optical axis B. Furthermore, the third unit holding frame 31 also receives a compressive force of the spring 33, and, against the third unit base plate 32, the positioning portion 31a of the third unit holding frame 31 is in a state of contacting with the positioning portion 32c of the third unit base plate 32. In other words, the third unit holding frame 31 is also positioned in the extending direction of the guide bar 34 (in the direction perpendicular to both the first optical axis A and the second optical axis B).

A third unit cover 35 is provided to cover a reflection surface of the prism L3a, and two engaging portions 35a formed on the third unit cover 35 respectively engage with engaging portions 31d formed in the third unit holding frame 31. Furthermore, since the third unit cover 35 moves closer to the third unit base plate 32 in the retracted state, the third unit cover 35 is formed of thin-walled resin and devised to ensure the resin wall thickness and the stiffness of the third unit base plate 32 can be secured. Note that the third unit cover 35 may be formed of a sheet-metal member.

The third unit base plate 32 has a hook engaging portion 32g, on which one end of a spring 36 exerting a pulling force thereon is hooked. The other end of the spring 36 is hooked on the hook engaging portion 10b of the fixed base plate 10. The third unit base plate 32 is in a state that, against the fixed base plate 10, a main positioning portion 32h formed on the third unit base plate 32 is brought into contact with a main positioning portion 10c formed on the fixed base plate 10 (see FIG. 18). Furthermore, a sub-positioning portion 32i formed on the third unit base plate 32 faces a sub-positioning portion 10d formed on the fixed base plate 10 leaving a slight clearance therebetween. Thus, the third unit base plate 32 is in a state of hardly tilting to the fixed base plate 10. In this way, the third unit base plate 32 is positioned in the extending direction (the second optical axis B direction) of the guide bars 13a and 13b.

At this time, the spring 36 is hooked at a predetermined angle in the moving direction of the third unit base plate 32. Since the third unit base plate 32 is housed inside the cam tube 8 in the retracted state, the positioning portion 32a of the third unit base plate 32 cannot take a long length of fitting to the guide bar 13a. Thus, an increase in variation in tilt of the third unit base plate 32 occurs due to fitting allowance between the positioning portion 32a and the guide bar 13a. Then, the third unit base plate 32 is also urged in the moving direction of the third unit base plate 32 to reduce tilt variation of the third unit base plate 32.

Furthermore, the closer the hooking position of the spring 36 is to the positioning portion 32a of the third unit base plate 32, the more difficult the third unit base plate 32 becomes to be hollowed out for the guide bar 13a. Therefore, the hook engaging portion 32g of the third unit base plate 32 is disposed on the guide bar 34 side of the hook engaging portion 10b of the fixed base plate 10.

Next, the operation of the lens barrel according to the present exemplary embodiment in the retracted state will be described with reference to FIG. 1A, FIG. 1B, FIG. 4, and FIGS. 11 to 15. Regarding the relationship between FIGS. 11A to 11E and FIGS. 12A to 12C or FIG. 14A to 14D, FIG. 11A corresponds to FIG. 12 or FIG. 14A, FIG. 11B corresponds to FIG. 14B, FIG. 11C corresponds to FIG. 12B, FIG. 11D corresponds to FIG. 14C, and FIG. 11E corresponds to FIG. 12C or FIG. 14D with respect to the time in operation.

In FIG. 1B, first, the stepping motor 62 is driven to move the sixth unit holding frame 6 toward the imaging plane. Then, the stepping motor 45 is driven to move the fourth unit base plate 42 to the outside of the fixed tube 9 while pressing the fifth unit holding frame 5 against the bias of the spring 51 during the movement.

Subsequently, the diaphragm shutter 41 fixed on the fourth unit base plate 42 moves to the outside of the fixed tube 9, and the cam tube 8 is then rotated by the output of the cam tube driving device to allow the first unit tube 12, the second unit base plate 22, the rectilinear motion tube 7, and the cam tube 8 to start retracting. At this time, as illustrated in FIGS. 11A to 11E, the third lens unit L3b moves to a space generated by the movement of the second lens unit L2 and is then housed inside the cam tube 8. Hereinafter, the operation of the second lens unit L2 and the third lens unit L3b in the retracted state will be described in detail.

In FIG. 14B, when the rectilinear motion tube 7 and the cam tube 8 are retracting, first, a protrusion 31e formed on the third unit holding frame 31 is brought into contact with the cam portion 7e formed on the rectilinear motion tube 7, allowing the third unit holding frame 31 to be driven to rotate around the guide bar 34. Since the protrusion 31e of the third unit holding frame 31 is far from the guide bar 34, the protrusion 31e of the third unit holding frame 31 can be formed in the vicinity of the apex angle (L3aE) of the prism L3a on the object side in the direction of the first optical axis A (see FIG. 9A).

At this time, the third unit base plate 32 holding the third unit holding frame 31 is urged by the spring 36 in the second optical axis B direction (toward the object). Thus, the protrusion 31e of the third unit holding frames 31 is also brought into contact with the contact portion 7f adjacent to the cam portion 7e of the rectilinear motion tube 7. The protrusion 31e can be rotationally driven while being in contact with the contact portion 7f. In this case, the third lens unit L3b performs a translational movement in the direction of the optical axis B (toward the imaging plane) against a pulling force of the spring 36. Such a translational movement depends on a relationship between a distance from the positioning portion 31a of the third unit holding frame 31 to the protrusion 31e and a rotation angle of the third unit holding frame 31.

A movement distance X of the third lens unit L3b in the direction of translational movement can be calculated from a length L of a straight line 31A connecting between the positioning portion 31a of the third unit holding frame 31 and the protrusion 31e and an angle θ of the line 31A to the second optical axis B, using the following equation:

$$X = Lx(\cos\theta_2 - \cos\theta_1)$$

where $\theta_1$ and $\theta_2$ represent angles θ before and after rotation of the third unit holding frame 31, respectively.

In the present embodiment, during transferring from the photographing state to the above retracted state, the rectilinear motion tube 7 provided as a cylindrical body brings its cam portion 7e serving as a first contact portion and its contact portion 7f serving as a second contact portion into contact with the protrusion 31e of the holding member 31 to rotate and translate the holding member 31.

Subsequently, the taper portion 7g serving as a third contact portion is brought into contact with a taper portion 32j serving as a contact portion of the base plate member 32 provided as a support member, allowing the base plate member 32 provided as a support member to perform a translational movement.

In the rectilinear motion tube 7, after the contact of the taper portion 7g provided as a third contact portion with the taper portion 32j of the base plate member 32, only the cam portion 7e is brought into contact with the protrusion 31e of the holding member 31 to restrict rotation of the protrusion 31e and the cam portion 7e. Thus, rotation of the holding member 31 does not occur, and the holding member 21 only performs a translational movement without rotation.

However, as a modified embodiment, even after bringing the taper portion 7g serving as a third contact portion into contact with a taper portion 32j serving as a contact portion of the base plate member 32 provided as a support member, the protrusion 31e of the holding member is brought into contact with the cam portion 7e and the contact portion 7f, allowing the holding member 31 to continue rotating.

At this time, the rotation preventing portion 31b, hook engaging portion 31c, and protrusion 31e of the third unit holding frame 31 are disposed on the same plane as the side of the prism L3a. In FIG. 16A, the third unit holding frame 31 receives from the spring 33 a component force F1 parallel to the direction of the first optical axis A, thereby tilting in a direction S1 relative to the hook engaging portion 31c, on which one end of spring 33 is hooked. As illustrated in FIG. 16B, when both the rotation preventing portion 31b (the rotation preventing portion 32e of the third unit base plate 32) and the hook engaging portion 31c of the third unit holding frame 31 are respectively disposed on the opposite sides of the prism L3a, the length L between the rotation preventing portion 31b and the hook engaging portion 31c becomes long.

Therefore, the third unit holding frame 31 is greatly influenced by the tilt thereof due to the fitting allowance between the positioning portions 32c and 32d of the third unit base plate 32 and the guide bar 34. The same is true in the case where the third unit holding frame receives from the spring 33 a component force in parallel to the second optical axis B direction.

In FIG. 17A, the hook engaging portion 31c of the third unit holding frame 31 receives from the spring 33 the component force F1 parallel to the direction of the first optical axis A and the protrusion 31e thereof receives from rectilinear motion tube 7 a thrust force F2 parallel to the direction of the first optical axis A. As illustrated in FIG. 17B, the hook engaging portion 31c and protrusion 31e of the third unit holding frame 31 are respectively disposed on the opposite sides of the prism L3, the length L between the hook engaging portion 31c and the protrusion 31e becomes long.

Thus, moment M loaded on the third unit holding frame 31 increases, so that the third unit holding frame 31 can be easily hollowed out of the third unit base plate 32. Then, the rotation preventing portion 31b, hook engaging portion 31c, and protrusion 31e of the third unit holding frame 31 are disposed on the same plane of the side of the prism L3a to restrict the tilt of the third unit holding frame 31 and the hollowing-out thereof to the third unit base plate 32.

Furthermore, the above configuration allows the actuator 41a of the diaphragm shutter 41 to enter the opposite side of the prism L3a, thereby realizing space saving of the lens barrel (see FIG. 18). Furthermore, the positioning portion 32a of the third unit base plate 32 is arranged in the vicinity of the protrusion 31e of the third unit holding frame 31. The positioning portion 32a of the third unit base plate 32 fits to a wide range of the guide bar 13a. Thus, even when the rectilinear motion tube 7 is brought into contact with the protrusion 31e of the third unit holding frame 31 and places a load thereon in the direction of the optical axis A, a stress is hardly concentrated on the guide bar 13a.

Figure 12A:
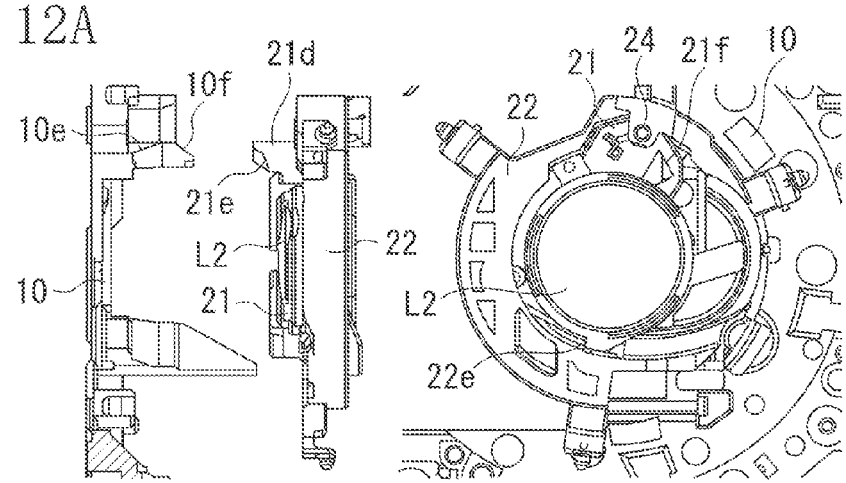
FIGS. 12A, 12B, and 12C are operation explanatory diagrams of the second lens unit of the lens barrel in the retracted state according to the exemplary embodiment of the present invention (photographing state (FIG. 12A) to retracted state (FIG. 12C).
Figure 12B:
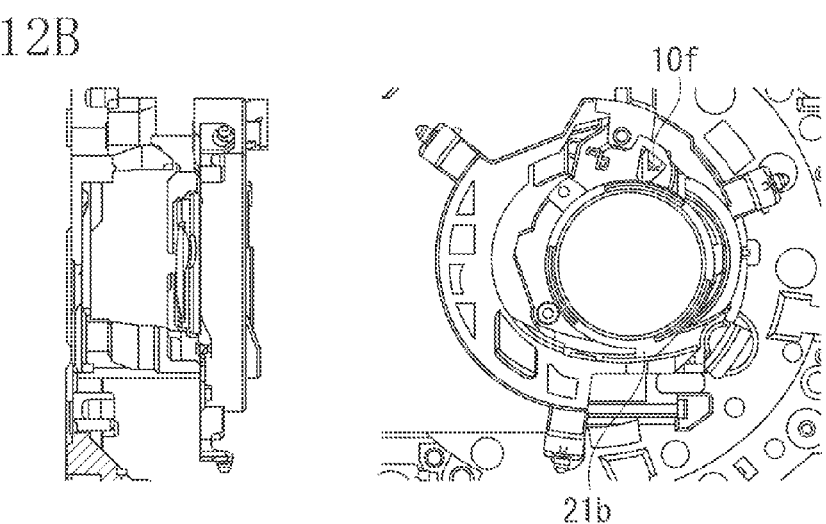
Figure 12C:
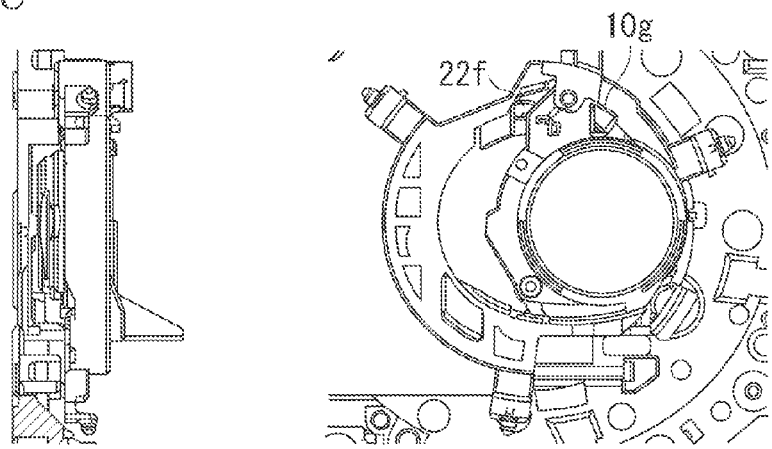

In FIG. 12B, when the third unit holding frame 31 rotates, the cam portion 21e formed on the protrusion 21d of the second unit holding frame 21 is brought into contact with the cam portion 10f formed on the protrusion 10e of the fixed base plate 10. When the cam portion 21e is brought into contact with the cam portion 10f, a component force perpendicular to the direction of the optical axis A is generated along the shape of each cam portion, and the second unit holding frame 21 is driven to rotate counterclockwise around the guide bar 24.

When the second unit holding frame 21 has rotated to the limit, the contact portion 21f adjacent to the cam portion 21e and parallel to the first optical axis A is brought into contact with the contact portion 10g adjacent to the cam portion 10f and parallel to the direction of the first optical axis A, thereby allowing the fixed base plate 10 to restrict rotation of the second unit holding frame 21. Thus, any load is not applied to the second unit holding frame 21 in the direction of the first optical axis A. In the retracted state, therefore, any load is hardly applied to both the second unit base plate 22 supporting the second unit holding frame 21 and the cam tube 8 engaging with the second unit base plate 22, As a result, a decrease in retraction load of the lens barrel occurs.

In FIG. 14C, when the second unit holding frame 21 has rotated to the limit, the taper portion 32j formed on the third unit base plate 32 is then brought into contact with the taper portion 7g formed on the rectilinear motion tube 7. When the taper portion 32j is brought into contact with the taper portion 7g, a component force perpendicular to the direction of the first optical axis A is generated, and the third unit group plate 32 performs a translational movement in the direction of the second optical direction B (toward the imaging plane) against a pulling force of the spring 36. Subsequently, the protrusion 31e of the third unit holding frame 31 separates from the contact portion 7f of the rectilinear motion tube 7, thereby only contacting the cam portion 7e. Therefore, the third unit holding frame 31 is only rotationally driven by the cam portion 7e (see FIG. 14D).

The third lens unit L3b can perform a translational movement by the protrusion 31e of the third unit holding frame 31 and the cam portion 7e and contact portion 7f of the rectilinear motion tube 7 even without the taper portion 32j of the third unit base plate 32 and the taper portion 7g of the rectilinear motion tube 7. In this case, however, in order to make the movement distance of the third lens unit in the translation direction longer, there is a need of making the length L of the straight line 31A between the positioning portion 31a and the protrusion 31e of the third unit holding frame 31 longer. Thus, the third unit holding frame 31 becomes large, and downsizing of the lens barrel becomes difficult. Then, both the taper portion 32j of the third unit base plate 32 and the taper portion 7g of the rectilinear motion tube 7 compensate the movement distance of the third lens unit in the translation direction, thereby attaining a reduction in size of the lens barrel.

In FIGS. 19A and 19B, furthermore, the contact portion 321 formed on the third unit base plate 32 faces the contact portion 10h formed on the fixed base plate 10, leaving a slight clearance therebetween in the direction of the first optical axis A. Therefore, even when the taper portion 32*j* of the third unit base plate 32 is brought into contact with the taper portion 7*g* of the rectilinear motion tube 7, and receives a load in the direction of the first optical axis A, the guide bar 13*a* near the taper portion 32*j* is not displaced more than a predetermined amount in the first optical axis A direction. Thus, the third unit base plate 32 can perform a translational movement without being hollowed out by the guide bar 13*a*.

In FIG. 14D, when the third unit base plate 32 has performed a translational movement, the contact portion 32*k* of the third unit base plate 32, which is adjacent to the taper portion 32*j* and in parallel to the direction of the first optical axis A, is brought into contact with the contact portion 7*h* of the rectilinear motion tube 7, which is adjacent to the taper portion 7*g* and in parallel to the direction of the first optical axis A. The rectilinear motion tube 7 restricts the translational movement of the third unit base plate 32. Thus, after the translational movement, any load is not applied to the third unit base plate 32 in the direction of the first optical axis A. Therefore, a thrust force applied to the rectilinear motion tube 7 during starting decreases in the direction of the first optical axis A, so that the lens barrel becomes difficult to start a sudden movement.

In the retracted state, on the positioning portion 32*a* side of the third unit base plate 32, the contact portion 7*h* of the rectilinear motion tube 7 restricts the position of the contact portion 32*k*. On the vibration stopper 32*b* side, however, there is no positional restriction. Thus, when an impact is given to the lens barrel by dropping or the like, the vibration stopper 32*b* of the third unit base plate 32 vibrates around the contact portion 32*k*. The contact portion 7*h* of the rectilinear motion tube 7 contacting the contact portion 32*k* may be damaged by a load due to such vibration. Then, the position of the vibration stopper 32*b* is restricted in the second optical axis B direction by the vibration stoppers 12*d* and 12*e* formed on the first unit tube 12, thereby reducing vibration of the vibration stopper 32*b*.

The holding member 12 holding the first lens unit L1 restricts movement of the prism L3*a*, which serves as a bending optical element.

Consequently the retraction operation of the lens barrel is completed. In the photographing state, which is opposite to the retracted state, the first unit tube 12 and the second unit base plate 22 are first extended, followed by extension of the rectilinear motion tube 7 as a cylindrical body and the cam tube 8. Subsequently, after extension of the first unit tube 12, second unit base plate 22, rectilinear motion tube 7, and cam tube 8 to a predetermined position, the fourth unit base plate 42 moves to a predetermined position with the fifth unit holding frame 5, and then the sixth unit holding frame 6 moves to a predetermined position.

Referring now to FIG. 21, the state of the first optical axis unit according to the present exemplary embodiment in the retracted state will be described.

In FIG. 21, the prism L3*a* serving as a bending optical element rotates almost 45 degrees relative to the guide bar 34 as a rotation axis, which is provided as a third axis perpendicular to the first optical axis and the second optical axis, in the photographing state, thereby being aligned in parallel to the second lens unit L2 in the direction of the optical axis B. In addition, the prism L3*a* moves to the imaging plane side due to a relationship between the positioning portion 31*a* and the protrusion 31*e* of the third unit holding frame 31. Thus, the prism L3*a* is disposed to the imaging plane side with respect to the second lens group L2. Furthermore, the apex angle L3*a*E of the prism L3*a* enters a narrow diameter portion L2D of the lens unit L2, so that the prism L3*a* and the second lens unit L2 overlap each other (OL) as viewed in the direction of the first optical axis A.

The above configuration allows the prism L3*a* and the second lens unit L2 to be disposed in contiguity with each other in the second optical axis B direction to realize a reduction in diameter of the lens barrel.

The second lens unit L2 moves in the direction of the second optical axis B during shifting from the photographing state to the retracted state. The prism L3*a* moves in a direction different from that of the second lens unit L2 with respect to the direction of the second optical axis B during shifting from the photographing state to the retracted state. In the retracted state, therefore, the cylindrical body provided as the rectilinear motion tube 7 houses the second lens unit 2L and the prism L3*a*.

When the prism L3*a* serving as a bending optical element shifts from the photographing state to the retracted state, the prism L3*a* rotates about as a rotational axis the third axis (guide bar 34) perpendicular to the first optical axis and the second optical axis, thereby moving in a direction opposite to that of the second lens unit 2L with respect to the second optical axis B direction.

In the second unit base plate 22, an annular section 22*g* is formed in a space between an exit surface of the prism L3*a* and the rectilinear motion tube 7. Thus, the member stiffness of the second unit base plate 22 is secured without making the second unit base plate 22 large in an outer diameter direction.

A light shielding portion 21*h* is formed in the second unit holding frame 21 and located in a space between the second lens group L2 and an entrance surface of the prism L3*a*. In FIG. 22, furthermore, the light shielding portion 21*h* covers a space C2 between a cylindrical portion 21*g* of the second unit holding frame 21 and the second unit base plate 22 in the photographing state. The space C2 is the one generated for allowing the third lens unit L3*b* and the third unit holding frame 31 in the retracted state to penetrate the second unit base plate 22 in the direction of the optical axis A. If there is no light shielding portion 21*h* formed in the second unit holding frame 21, a light flux G1 will pass through the space C2 and reach the imaging plane, as illustrated in FIG. 23. Hence, an undesired effect such as a ghost will influence image quality.

Thus, the light shielding portion 21*h* is formed on the second unit holding frame 21 to prevent an undesired light flux passing through the space C2 from reaching the imaging plane. Furthermore, in the photographing state, the light shielding portion 21*h* formed on the second unit holding frame 21 and the light shielding portion 22*h* formed on the second unit base plate 22 overlap each other (02) as viewed in the direction of the first optical axis A. Thus, these light shielding portions 21*h* and 22*h* face each other, leaving a slight clearance therebetween in the first optical axis A direction and in the second optical axis B direction.

The above configuration makes the light flux G1 passing through the space C2 difficult to pass through between the light shielding portion 21*h* and the light shielding portion 22*h*. Furthermore, the light shielding portion 21*h* is disposed to the imaging plane side with respect to the light shielding portion 22*h*, achieving light shielding measures without an increase in size of the second lens unit L2 in the direction of the first optical axis A.

Figure 24B:
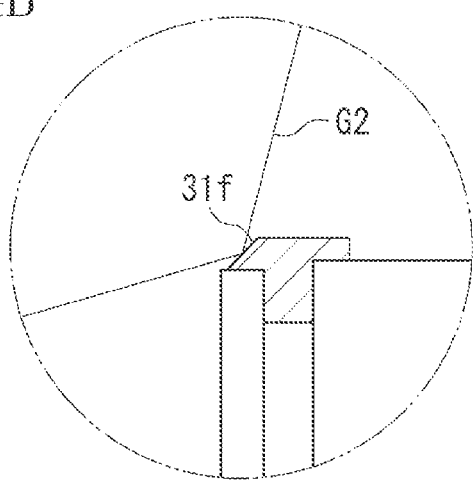

A chamfer portion 31*f* is formed on the third unit holding frame 31. In the retracted state, the first lens unit L1 enters a space generated by the chamfer portion 31*f*, which is of a step-like shape. In addition, a light shading block, which is parallel or perpendicular to the first optical axis A direction, is formed on the chamfer portion 31f (see FIG. 7). If such a light shading block is not formed on the chamfer portion 31f, a light flux G2 as illustrated in FIG. 24 reflects on the chamfer portion 31f and reaches the imaging plane because the chamfer portion 31f has a predetermined angle with respect to the entrance and exit surfaces of the prism L3a.

In the retracted state, a lens or lenses which constitute the first lens unit L1 disposed on the object side relative to the second lens unit L2 are located in the stepped chamfer portion formed on the holding member holding the prism L3a in the direction of the first optical axis A.

Hence, an undesired effect such as a ghost may influence image quality. Then, a shading bunch is formed on the chamfer portion 31f of the third unit holding frame 31 such that the shading bunch is parallel or perpendicular to both the entrance surface and exit surfaces of the prism L3a. Hence, an undesired light flux can be prevented from reaching the imaging plane. The above configuration achieves light shielding measures while achieving a size reduction of the lens barrel.

Although the present exemplary embodiment has been described above, but the present invention is not limited to the embodiment and various modifications and changes may be made within the scope of the gist of the present invention.

In the exemplary embodiment of the present invention, the exemplary configuration has been illustrated as the one in which the third lens unit is driven by the rectilinear motion tube 7. However, the present invention is not limited to such a configuration. Alternatively, for example, the present invention is applicable to another configuration in which the third lens unit is driven by another cylindrical member.

Furthermore, the exemplary configuration has been illustrated as the one in which the position of the vibration stopper 32b of the third unit base plate 32 is restricted in the direction of the second optical axis B by the vibration stoppers 12d and 12e formed on the first unit tube 12. However, the present invention is not limited to such a configuration. Alternatively, for example, the present invention is also applicable to another configuration in which the position of the vibration stopper 32b of the third unit base plate 32 is restricted by another cylindrical member.

Furthermore, the exemplary configuration has been illustrated as the one in which the prism L3a rotates almost 45 degrees in the retracted state. However, the present invention is not limited to such a configuration. Alternatively, for example, the present invention is applicable to another configuration in which the number of rotations is not limited as long as the prism L3a is rotating in the photographing state.

Furthermore, the exemplary configuration has been illustrated as the one that allows the actuator 41a of the diaphragm shutter 41 to enter the opposite side of the prism L3a on which the rotation preventing portion 31b, hook engaging portion 31c, and protrusion 31e of the third unit holding frame 31 are disposed. However, the present invention is not limited to such a configuration. Alternatively, the present invention is applicable to a configuration that allows portion of another member to enter the opposite side of the prism L3a on which the rotation preventing portion 31b, hook engaging portion 31c, and protrusion 31e of the third unit holding frame 31 are disposed. Alternatively, the present invention is also applicable to a configuration that allows part of another member to enter the same side of the prism L3a on which the rotation preventing portion 31b, hook engaging portion 31c, and protrusion 31e of the third unit holding frame 31 are disposed.

Furthermore, the exemplary configuration has been illustrated as the one in which the apex angle L3aE of the prism L3a enters a narrow diameter portion L2D of the lens unit L2. However, the present invention is not limited to such a configuration. Alternatively, the present invention is applicable to a configuration in which the apex angle L3aE of the prism L3a enters a narrow diameter lens of the second lens unit L2 including a plurality of lenses.

Furthermore, the exemplary configuration has been illustrated as the one in which the annular section 22g of the second unit base plate 22 is formed in a space between the exit surface of the prism L3a and the rectilinear motion tube 7. However, the present invention is not limited to such a configuration. Alternatively, the present invention is applicable to a configuration in which part of another member is formed in a space between the exit surface of the prism L3a and the rectilinear motion tube 7.

Furthermore, the exemplary configuration has been illustrated as the one in which the third lens unit L3b and the third unit holding frame 31 penetrate the second unit base plate 22 in the retracted state. However, the present invention is not limited to such a configuration. Alternatively, the present invention is applicable to a configuration in which another member penetrates the second unit base plate 22.

Furthermore, the exemplary configuration has been illustrated as the one in which the light shielding portion 21h of the second unit holding frame 21 is located in a space between the second lens group L2 and the entrance surface of the prism L3a. However, the present invention is not limited to such a configuration. Alternatively, the present invention is applicable to a configuration in which part of another member is located in a space between the second lens group L2 and the entrance surface of the prism L3a.

Furthermore, the exemplary configuration has been illustrated as the one in which the first lens unit L1 is allowed to enter a space generated by the chamfer portion 31f in the retracted state. However, the present invention is not limited to such a configuration. Alternatively, the present invention is applicable to a configuration in which part of another member is allowed to enter a space generated by the chamfer portion 31f in the retracted state.

According to the exemplary embodiment of the present invention, a lens barrel adopting a bending photographic optical system, which can be reduced in diameter and in thickness, can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-247664 filed Nov. 9, 2012, and No. 2012-247663 filed Nov. 9, 2012, which are hereby incorporated by reference herein in their entirety.

What is claimed is:

1. A lens barrel comprising:
a first lens disposed on a first optical axis;
a bending optical element configured to bend a light flux incident from a direction of the first optical axis toward a direction of a second optical axis extending in a direction different from the direction of the first optical axis;
a holding member configured to hold the bending optical element,
wherein, when the lens barrel shifts from a photographing state to a retracted state, the holding member holding the bending optical element moves along the second optical axis while rotating around a rotational axis extending in a direction different from the directions of the first optical axis and the second optical axis; and a movable tube configured to move backward and forward in the direction of the first optical axis in conjunction with a movement of the first lens, wherein, when the lens barrel shifts from the photographing state to the retracted state, the holding member holding the bending optical element contacts the movable tube moving in the direction of the first optical axis within the movable tube to rotate around a rotational axis perpendicular to both the first optical axis and the second optical axis and to move along the second optical axis.

2. The lens barrel according to claim 1, wherein the movable tube includes:

a first contact portion and a second contact portion each configured to rotate and translate the holding member holding the bending optical element within the movable tube; and a third contact portion configured to translate the holding member holding the bending optical element within the movable tube.

3. The lens barrel according to claim 1, further comprising a second lens disposed on an object side relative to the first lens, wherein, in the retracted state of the lens barrel, a movement of the holding member holding the bending optical element is restricted by a holding member holding the second lens.

4. The lens barrel according to claim 1, wherein the holding member holding the bending optical element is urged at a predetermined angle to the second optical axis.

5. The lens barrel according to claim 2, wherein the holding member holding the bending optical element is supported by a support member and includes a protrusion configured to contact the movable tube, wherein the movable tube includes a first contact portion and a second contact portion each configured to contact the protrusion to rotate and translate the holding member holding the bending optical element within the movable tube, and a third contact portion configured to contact a contact portion of the support member and disposed nearer the rotational axis than the first contact portion and configured to translate the holding member holding the bending optical element within the movable tube.

6. The lens barrel according to claim 5, wherein, when the lens barrel shifts from the photographing state to the retracted state, the movable tube is configured such that the first contact portion and the second contact portion contact the protrusion of the holding member holding the bending optical element to rotate and translate the holding member holding the bending optical element within the movable, and the third contact portion contacts the contact portion of the support member to translate the support member.

7. The lens barrel according to claim 6, wherein the movable tube is configured such that, after the third contact portion contacts the contact portion of the support member, only the first contact portion contacts the protrusion of the holding member to allow the protrusion and the first contact portion to restrict rotation of the holding member holding the bending optical element and to translate the holding member holding the bending optical without rotation.

8. The lens barrel according to claim 6, wherein the movable tube is configured such that, even after the third contact portion contacts the contact portion of the support member, the first contact portion contacts the protrusion of the holding member holding the bending optical element to continue rotating and translating the holding member holding the bending optical element.

9. An imaging apparatus comprising:
the lens barrel according to claim 1; and
an image sensor.

10. A lens barrel comprising:
a first lens disposed on a first optical axis;
a bending optical element configured to bend a light flux incident from a direction of the first optical axis toward a direction of a second optical axis extending in a direction different from the direction of the first optical axis; and
a holding member configured to hold the bending optical element,
wherein, when the lens barrel shifts from a photographing state to a retracted state, the first lens rotates around a rotational axis extending in the direction of the first optical axis to move in the direction of the second optical axis,
wherein, when the lens barrel shifts from the photographing state to the retracted state, the holding member holding the bending optical element moves along the second optical axis in a direction opposite to that of the first lens in the direction of the second optical axis with respect to the first optical axis, and
wherein, in the retracted state, a second lens disposed on an object side relative to the first lens is located in a stepped chamfer portion formed on the holding member holding the bending optical element in the direction of the first optical axis.

11. The lens barrel according to claim 10, wherein, in the retracted state, an apex angle of the bending optical element overlaps the first lens as viewed in the direction of the first optical axis.

12. A lens barrel comprising:
a first lens disposed on a first optical axis;
a bending optical element configured to bend a light flux incident from a direction of the first optical axis toward a direction of a second optical axis extending in a direction different from the direction of the first optical axis;
a holding member configured to hold the bending optical element,
wherein, when the lens barrel shifts from a photographing state to a retracted state, the first lens rotates around a rotational axis extending in the direction of the first optical axis to move in the direction of the second optical axis, and
wherein, when the lens barrel shifts from the photographing state to the retracted state, the holding member holding the bending optical element moves along the second optical axis in a direction opposite to that of the first lens in the direction of the second optical axis with respect to the first optical axis;
a first holding member configured to rotate around a rotational axis extending in the direction of the first optical axis while holding the first lens to move in the direction of the second optical axis; and
a second holding member configured to move in the direction of the first optical axis while holding the first holding member holding the first lens, using a movable tube as a guide member.

13. The lens barrel according to claim 12, wherein, in the retracted state of the lens barrel, the second holding member is disposed between the movable tube and an exit surface of the bending optical element.

14. The lens barrel according to claim 12, wherein, in the retracted state of the lens barrel, a protrusion of the first holding member is disposed between an entrance surface of the bending optical element and the first lens.

15. An imaging apparatus comprising:
the lens barrel according to claim 10; and
an image sensor.

* * * * *